United States Patent [19]

Siebert et al.

[11] Patent Number: 5,198,510

[45] Date of Patent: Mar. 30, 1993

[54] MODIFICATION OF VINYL ESTER RESINS WITH REACTIVE LIQUID POLYMERS

[75] Inventors: Alan R. Siebert, Orange Village; C. Dale Guiley, Medina, both of Ohio

[73] Assignee: The BF Goodrich Company, Brecksville, Ohio

[21] Appl. No.: 641,703

[22] Filed: Jan. 22, 1991

Related U.S. Application Data

[63] Continuation-in-part of Ser. No. 515,793, Apr. 27, 1990, Pat. No. 5,053,496.

[51] Int. Cl.$^5$ .................... C08F 283/00; C08G 59/46
[52] U.S. Cl. ................................. 525/531; 525/530; 525/532; 525/119; 525/922; 525/911
[58] Field of Search ............... 525/531, 922, 119, 911, 525/530, 532; 528/100, 111.3, 113

[56] References Cited

U.S. PATENT DOCUMENTS

| | | | |
|---|---|---|---|
| Re. 31,310 | 7/1983 | Najvar .......................... | 525/531 |
| 2,565,573 | 8/1951 | Pease et al. . | |
| 2,586,995 | 2/1952 | Robertson . | |
| 3,285,949 | 11/1966 | Siebert . | |
| 3,324,198 | 6/1967 | Gruver et al. ................ | 528/113 |
| 3,674,893 | 7/1972 | Nowak et al. ................ | 525/112 |
| 3,823,107 | 7/1974 | Cotton . | |
| 3,850,856 | 11/1974 | Dreyfuss . | |
| 3,892,819 | 7/1975 | Najvar' . | |
| 3,910,992 | 10/1975 | Skillicorn . | |
| 3,928,491 | 12/1975 | Waters . | |
| 4,039,527 | 8/1977 | Nagaoka et al. . | |
| 4,045,427 | 8/1977 | Sheppard et al. . | |
| 4,075,286 | 2/1978 | MacLeay et al. . | |
| 4,530,962 | 7/1985 | Alexander . | |
| 4,684,717 | 8/1987 | Ashitaka et al. . | |
| 4,824,500 | 4/1989 | White et al. .................. | 525/531 |
| 4,866,134 | 9/1989 | Takano et al. ................ | 525/112 |
| 4,990,587 | 2/1991 | Shaw et al. .................. | 528/113 |
| 5,055,532 | 10/1991 | Hoffman et al. ............. | 525/531 |

FOREIGN PATENT DOCUMENTS 0224411  6/1987  European Pat. Off. .

OTHER PUBLICATIONS

"The Chemistry of Rubber-Toughened Epoxy Resins", By: A. R. Siebert and C. K. Riew.
"Hycar ®Reactive liquid Polymers", Feb. 1990, By: The BF Goodrich Company Chemical Group, Cleveland, OH.

Primary Examiner—Robert E. Sellers
Assistant Examiner—Randy Gulakowski
Attorney, Agent, or Firm—Hudak & Shunk

[57] ABSTRACT

Vinyl ester resins of the type already having reactive liquid polymers reacted into the backbone of the resins, are cured in the presence of a reactive liquid polymer additive admixed with the prereacted vinyl ester resin. Heating of the system during cure causes the reactive liquid polymer additive to miscibilize with the vinyl ester base resin. The vinyl ester resin modified in the manner described above shows a significant enhancement in toughness as measured by fracture energy over unmodified counterparts or counterparts modified by known methods of adduction or admixing alone.

25 Claims, 6 Drawing Sheets

FRACTURE ENERGY OF ETBN MODIFIED DERAKANE 8084, 411, AND BLEND THEREOF PLOTTED AGAINST TOTAL RUBBER CONTENT

FRACTURE ENERGY OF HYDRIN MODIFIED DERAKANE 8084 AND DERAKANE 411 PLOTTED AGAINST TOTAL RUBBER CONTENT

MODIFICATION OF VINYL ESTER RESINS WITH REACTIVE LIQUID POLYMERS

CROSS REFERENCE

This application is a continuation-in-part of U.S. patent application Ser. No. 07/515,793, now U.S. Pat. No. 5,053,496 filed Apr. 27, 1990, for "Low Viscosity Statistical Monofunctional Carboxylic-Terminated, Amine-Terminated, or Epoxy-Terminated Reactive Liquid Rubber Polymers, and a Process For Preparation Thereof."

FIELD OF THE INVENTION

The invention relates to the modification of vinyl ester resins, and in particular to the modification of prereacted vinyl ester base resins with reactive liquid polymers. More particularly, the invention relates to the modification of vinyl ester base resins, which already have reactive liquid polymers reacted into their backbones, by admixing reactive liquid polymer additives with the prereacted vinyl ester resin and curing the resin in the presence of heat. It is to be understood that use of the term "additive" in connection with reactive liquid polymers herein refers to reactive liquid polymers capable of reacting due to their statistical functionality or reactive end groups, but which are admixed or added to the prereacted vinyl ester resins in an unreacted or free state, and which upon curing of the base resins in the presence of heat physically associate or affiliate with the reactive liquid polymers already reacted into the backbones of the base resins to form the modified vinyl ester resin of the present invention.

BACKGROUND

Heretofore, in general, there have been two known methods for modifying or toughening thermoset resins with reactive liquid polymers (hereinafter RLPs) to improve properties such as fracture energy ($G_{Ic}$) and impact strength without adversely affecting the thermomechanical property retention of the resins. This reaction can be accomplished by modifying the epoxy resin end group so that the polymer product can participate in the thermoset cure. The first prior art method is the adduction or reaction of carboxyl-terminated butadiene-acrylonitrile type copolymers with epoxy resins. This reaction can be accomplished by modifying the epoxy resin end group so that the polymer product can participate in the thermoset cure. Such adducted systems can be cured in a conventional manner to give elastomer or rubber-modified thermoset resin systems having a significant enhancement in toughness, as measured by fracture energy, over their unmodified counterparts.

A second prior art method of modifying thermoset resins is by admixing a RLP into the resin. Although generally any RLP product can be mixed into any thermoset resin to give a modified thermoset resin system having the characteristic enhanced toughness, such a combination generally is not miscible. Such lack of miscibility between the RLP and the thermoset resin results in the necessity to thoroughly mix the composition prior to use, which is inconvenient and impractical for most applications.

Although thermoset resins modified by either of the two prior art methods described above display improved toughness over their unmodified counterparts, thus making them suitable for use in certain applications, such modified thermoset resins still are unsuitable for use in many applications where an even greater level of toughness is required.

U.S. Pat. No. 3,892,819 to Najvar relates to vinyl ester resins with improved impact resistance obtained by a process modification wherein up to 20 percent of the unsaturated monocarboxylic acid, which is reacted with a polyepoxide, is replaced by an equivalent amount of a liquid carboxyl terminated polydiene rubber capable of reacting with epoxy groups to form a chemically bound molecule.

U.S. Pat. No. 3,928,491 to Waters relates to a flexible crack-resistant and chemically resistant thermosetting vinyl ester resin which is produced by coreacting an epoxy resin, a carboxyl terminated elastomer and an unsaturated monocarboxylic acid, such as acrylic or methacrylic acid. The neat resin is miscible and copolymerizable with ethylenically unsaturated monomers such as styrene. A novel cast pipe utilizes the resin of the invention as an unreinforced crack-resistant inner lining.

SUMMARY OF THE INVENTION

Objects of the present invention include producing a modified vinyl ester resin composition having improved fracture energy toughness while retaining other properties including thermomechanical properties, by admixing and miscibilizing a reactive liquid polymer additive with a vinyl ester resin already having a reactive liquid polymer reacted into the backbone of the resin composition.

Another object of the present invention includes providing a method for controlling the morphology of the modified vinyl ester resin composition.

A further object of the present invention includes providing such a modified vinyl ester resin composition, wherein the resin composition generally includes the same concentration of RLP or total rubber content as that present in prior modified vinyl ester resin systems.

These objects are obtained by the vinyl ester resin composition of the present invention, comprising, a generally uniformly dispersed admixture of a prereacted vinyl ester base resin having a reactive liquid polymer reacted into its backbone, and an effective amount of a reactive liquid polymer additive to improve the fracture energy of the vinyl ester resin composition.

These objects are further obtained by the method of toughening vinyl ester resins with reactive liquid polymers of the present invention, wherein the method comprises the steps of, admixing a reactive liquid polymer additive with a prereacted vinyl ester base resin having a reactive liquid polymer reacted into its backbone, and curing the admixture.

DETAILED DESCRIPTION

Figure 1:
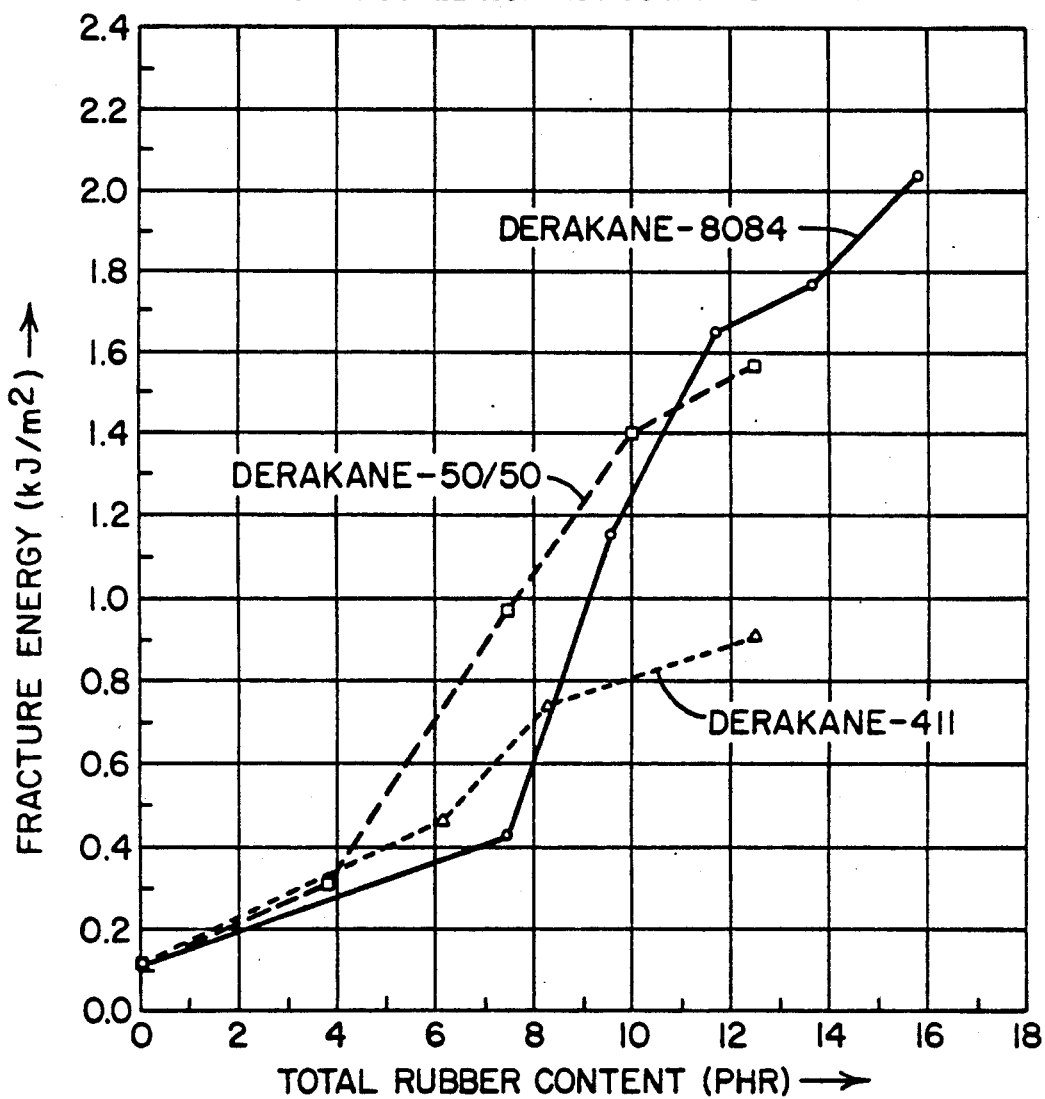
FIG. 1 is a graph showing the fracture energy of two different vinyl ester resins and blends thereof, plotted against the total rubber content of the resins and resin blends, including the amount of epoxy-terminated butadiene-acrylonitrile type copolymer additive containing 17 percent bound acrylonitrile admixed with the resins.

The present invention relates to the production of modified vinyl ester resins having unexpectedly improved toughness as measured by fracture energy, through the admixing of RLP additives with vinyl ester base resins which already have RLP reacted into their backbones, without affecting thermomechanical property retention of the vinyl ester resins. The method of the present invention enables the morphology of the modified vinyl ester resins to be controlled, and achieves such improved fracture energies utilizing generally the same total elastomer content or concentration of RLPS as utilized in prior art methods of modification utilizing either the adduction or admixture methods alone. The present invention achieves miscibility of the RLP additive with the prereacted vinyl ester base resin preferably by admixing the RLP additive with the base resin and subsequently curing the vinyl ester resin system in the presence of heat. However, it is understood that the RLP additive could be admixed with the base resin during cure of the resin and in the presence of heat.

The prereacted vinyl ester resins utilized as a starting material in the present invention are formed in the following manner. Generally, a selected epoxy resin is brought together and reacted with a polyfunctional carboxyl-terminated RLP and an unsaturated monocarboxylic acid, wherein the polyfunctional carboxyl-terminated RLP has a functionality of from about 0.8 to about 3.5. More particularly, the prereacted vinyl ester base resin preferably is formed by reacting an excess of the selected epoxy resin with a statistically difunctional carboxyl-terminated RLP and an unsaturated monocarboxylic acid, wherein the statistically difunctional carboxyl-terminated RLP has a functionality of from about 1.7 to about 2.4. It is understood that other RLPs can be utilized for reacting with the epoxy resin and the unsaturated monocarboxylic acid, including but not limited to, RLPs having carboxyl functional groups substituted along the backbone of the RLP rather than on the ends thereof.

In general, an epoxy resin is a compound containing more than one α or 1,2-epoxy group which is designated by the structural formula:

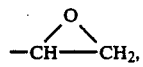

and which is capable of being converted to a useful thermoset or cured state by an amine curing agent as discussed hereinbelow, whether such α-epoxy group is situated internally, terminally, or on cyclic structures.

Epoxy resins which are suitable for use in the present invention include many commercially available epoxy resins and preferably diepoxy resins which are well-known to the art and to the literature. Desirable epoxy resins include polyhydric phenol polyether alcohols; glycidyl ethers of novolac resins such as epoxylated phenol-formaldehyde novolac resin; glycidyl ethers of mononuclear di- and trihydric phenols; glycidyl ethers of bisphenols such as diglycidyl ether of tetrabromobisphenol A; glycidyl ethers of polynuclear phenols; epoxy resin from diphenolic acid; glycidyl ethers of aliphatic polyols such as chlorine-containing aliphatic diepoxy and polyepichlorohydrin; glycidyl esters such as aliphatic diacid glycidyl esters and epoxidized phenolphthalein; glycidyl epoxies containing nitrogen such as glycidyl amides and amide-containing epoxies; glycidyl derivatives of cyanuric acid; glycidyl resins from melamines; glycidyl amines such as triglycidyl ether amine of p-aminophenol and bis(2,3-epoxypropyl)methylpropylammonium p-toluenesulfonate; and glycidyl triazines; thioglycidyl resins such as epoxidized bisulfide; silicon-glycidyl resins such as 1,4-bis[(2,3-epoxypropoxy)dimethylsilyl]; fluorine glycidyl resins; epoxy resins which are synthesized from monoepoxies other than epihalohydrins including epoxy resins from unsaturated monoepoxies such as polyallyl glycidyl ether and glycidyl sorbate dimer; epoxy resins from monoepoxy alcohols; epoxy resins from monoepoxies by ester interchange; epoxy resins from glycidaldehyde; polyglycidyl compounds containing unsaturation such as allyl-substituted diglycidyl ether of bisphenol A; epoxy resins which are synthesized from olefins and chloroacetyls such as butadiene dioxide, vinylcyclohexene dioxide, epoxidized polybutadiene, and bis(2,3-epoxycyclopentyl)ether; and epoxy-resin adducts of the above. A more comprehensive list of epoxy resins can be found in *Handbook of Epoxy Resins*, by Henry Lee and Kris Neville, McGraw-Hill, Inc., 1967, which is hereby incorporated by reference. One preferred epoxy resin polymer for use in the present invention is diglycidyl ether of bisphenol A (DGEBA) which has the following structural formula:

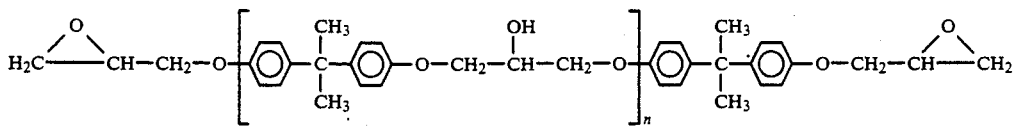

wherein n is an integer from 0 to 18, desirably from 0 to 14.3, and preferably from 0 to 5.5. The average molecular weight of DGEBA is from about 340 to about 4000, and preferably from about 340 to 2600. Another preferred epoxy resin polymer for use in the present invention is polyglycidyl ether of phenol-formaldehyde novolac[polyphenolformaldehydepoly(2,3-epoxypropyl)ether] or epoxy novolac resin which has the following structural formula:

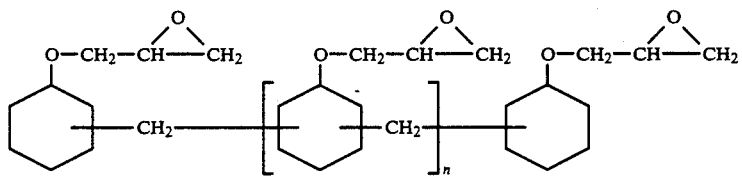

wherein n has a value of about 1.6.

The unsaturated monocarboxylic acids useful in the formation of the prereacted vinyl ester base resin used in the present invention include aliphatic and aromatic types. If the unsaturated mono carboxylic acid is aliphatic, it desirably contains 2 to 6 carbon atoms with preferred examples thereof being acrylic acid, methacrylic acid, itaconic acid, halogenated acrylic or methacrylic acids, or hydroxyalkyl acrylate or methacrylate half esters of dicarboxylic acids, wherein the hydroxyalkyl group preferably contains 2 to 6 carbon atoms, as described in U.S. Pat. No. 3,367,992 which is hereby fully incorporated by reference. If an aromatic unsaturated monocarboxylic acid is utilized, cinnamic acid is preferred. Blends of acrylic, methacrylic, itaconic, halogenated acrylic or methacrylic, and/or cinnamic acids may also be utilized. The use of methacrylic acid is highly preferred.

Suitable types of statistical dicarboxyl-terminated liquid rubbers which have been found satisfactory for use in the formation of the base resin of the invention, are manufactured by the assignee of the present invention, B. F. Goodrich Chemical Co., and are sold under the trademarks Hycar CTB, Hycar CTBN, Hycar CTBNX, and the like. Hycar CTB is a carboxyl-terminated butadiene type polymer and may be approximately represented by the formula:

$$HOOC\text{-}(CH_2\text{---}CH\text{=}CH\text{---}CH_2)_x\text{-}COOH$$

wherein x represents the number of butadiene units per molecule, with x desirably being from about 40 to about 300, and preferably from about 75 to about 85. Hycar CTB has a functionality of about 2.

Hycar CTBN is a carboxyl-terminated butadiene-acrylonitrile type random copolymer which may be approximately represented by the formula:

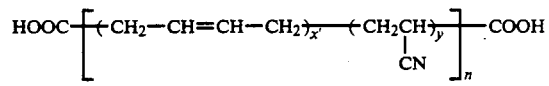

wherein x' represents the number of butadiene units per molecule and y represents the number of acrylonitrile units per molecule, with the weight ratio of x' to y being from about 0.9 to about 0.1 for the random copolymer containing 10 percent acrylonitrile, from about 0.8 to about 0.2 for the copolymer containing 17 percent acrylonitrile, and from about 0.7 to about 0.3 for the copolymer containing 26 percent acrylonitrile, and with n desirably being from about 40 to about 300, and preferably from about 75 to about 85. The copolymer has a functionality of from about 1.8 to about 1.85.

Hycar CTBNX is a carboxyl-terminated butadiene-acrylonitrile-acrylic acid terpolymer which may be approximately represented by the formula:

$$HOOC\text{-}(CH_2\text{---}CH\text{=}CH\text{---}CH_2)_{x''}\text{-}(CH_2\text{---}\underset{\underset{CN}{|}}{CH})_{y'}\text{-}(CH_2\underset{\underset{\underset{OH}{|}}{\underset{C=O}{|}}}{CH})_z\text{-}COOH$$

wherein x" represents the number of butadiene units per molecule, y' represents the number acrylonitrile units per molecule, and z represents the number of acrylic acid units per molecule, and further wherein the terpolymer contains from about 17 percent to about 20 percent acrylonitrile and preferably has a molecular weight of from about 2,000 to about 15,000. The terpolymer has a functionality of about 2.3. These and other elastomers having a functional carboxyl termination at each end of the polymer chain are described more fully in U.S. Pat. No. 3,285,949, which is hereby fully incorporated by reference.

An excess of the selected epoxy resin is reacted with a selected difunctional carboxyl-terminated RLP, and an unsaturated monocarboxylic acid. Generally, from about 1 percent to about 30 percent by weight of RLP and from about 99 percent to about 70 percent of the epoxy is utilized based on the weight of the RLP and the epoxy. An equivalent amount of the unsaturated monocarboxylic acid sufficient to react the excess amount of epoxy is utilized in the reaction. The reaction may be catalyzed in the conventional manner by tertiary amines such as pyridine, basic compounds such as sodium hydroxide, metal chelates, onium catalysts, triphenyl stibine, triphenyl phosphine and other catalysts known to those skilled in the art; wherein the preferred catalyst is pyridine. The reaction may also employ an effective amount of an inhibitor to prevent premature reaction at the acrylic acid double bonds. Approximately 100 to 600 parts per million of hydroquinone functions satisfactorily as a polymerization inhibitor. In forming such resins, the three ingredients (epoxy resin, unsaturated monocarboxylic acid and carboxyl-terminated elastomer) are mixed. An inhibitor and a suitable catalyst, such as a tertiary amine, is added and the mixture is heated to a suitable reaction temperature generally between room temperature and about 175° C. Heating of the reaction mixture continues until the acid value diminishes to a low level, indicating substantially complete reaction between the three reactants, i.e., that the product is free of unreacted epoxide groups and carboxylic acid groups. The product resin is directly recovered as a polymerizable thermosetting resinous substance.

The neat resin may then be mixed and copolymerized with a suitable ethylenically unsaturated monomer such as styrene, alpha methyl styrene, or an unsaturated aromatic compound such as vinyl toluene, with styrene being preferred. Other suitable ethylenically unsaturated monomers are those listed in U.S. Pat. Nos. 3,367,992 and 3,683,045, which are hereby fully incorporated by reference.

The following reactions occur during formation of the prereacted vinyl ester base resin useful in the present invention:

1. Epoxy Resin plus Hycar CTB, CTBN or CTBNX

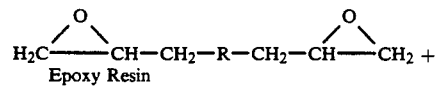
Epoxy Resin

-continued
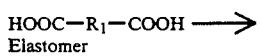
Elastomer

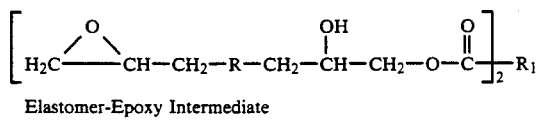
Elastomer-Epoxy Intermediate

2. Epoxy Resin plus Methacrylic Acid

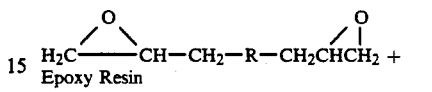
Epoxy Resin

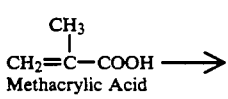
Methacrylic Acid

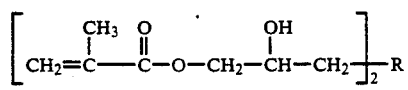
Neat Vinyl Ester Compound

3. Elastomer-Epoxy Intermediate plus Methacrylic Acid

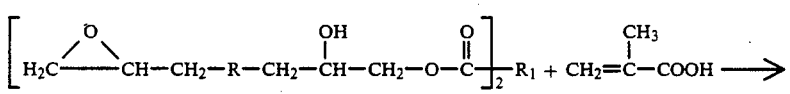

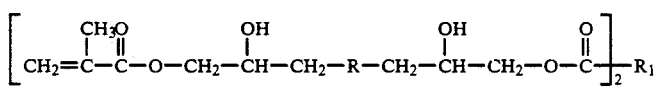

wherein

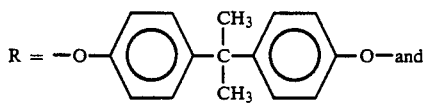

$R_1$ is $+CH_2-CH=CH-CH_2\frac{}{x}$, $+(CH_2-CH=CH-CH_2)_{x'}-(CH_2-CH)_{y'}$ or
$\qquad\qquad\qquad\qquad\qquad\qquad\quad |$
$\qquad\qquad\qquad\qquad\qquad\qquad\;\, CN$ $+(CH_2-CH=CH-CH_2)_{x''}-(CH_2-CH)_{y''}-(CH_2-CH)_{z''}$,
$\qquad\qquad\qquad\qquad\qquad\qquad\;\;\; |\qquad\qquad\quad |$
$\qquad\qquad\qquad\qquad\qquad\qquad\; CN\qquad\qquad C=O$
$\qquad\qquad\qquad\qquad\qquad\qquad\qquad\qquad\qquad\quad |$
$\qquad\qquad\qquad\qquad\qquad\qquad\qquad\qquad\qquad\; OH$ depending on whether Hycar CTB, Hycar CTBN, or Hycar CTBNX, which are fully described hereinabove, is utilized as the RLP.

The prereacted vinyl ester resin utilized as a starting material in the present invention is a mixture of the reaction products of reactions 2 and 3 outlined above.

The styrene-containing prereacted vinyl ester base resin may then be formed into a hard usable product by reacting the double bonds in the presence of a peroxide such as benzoyl peroxide. With regard to the preparation of the prereacted vinyl ester resin starting material utilized in the formation of the modified vinyl ester resin composition of the present invention, U.S. Pat.

Nos. 3,892,819 and 3,928,491 are hereby fully incorporated by reference.

In accordance with one of the main features of the present invention, selected RLP additives are admixed with the prereacted vinyl ester base resin material set forth above. Various RLP types may be utilized for admixing into the prereacted vinyl ester resin, including nonfunctional, monofunctional and/or difunctional forms of a selected type. Examples of suitable RLP additives include carboxyl-terminated butadiene type polymers and carboxyl-terminated butadiene-acrylonitrile type copolymers. The formation of the statistical difunctional form of such carboxyl-terminated polymers is fully described in U.S. Pat. No. 3,285,949 which is hereby fully incorporated by reference. The nonfunctional butadiene-acrylonitrile copolymer is well known to the art and to the literature.

With regard to the statistical monofunctional form of such carboxyl-terminated polymers, it is made by reacting a vinyl-containing monomer with a difunctional initiator as well as a nonfunctional initiator and can be generally indicated by the structural formula:

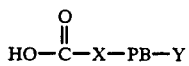

wherein

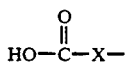

is derived from the difunctional initiator and —Y is derived from the nonfunctional initiator and wherein —PB— represents the carbon-carbon backbone of the polymer. Generally, the difunctional carboxyl-terminated polymer is generally represented by the structural formula

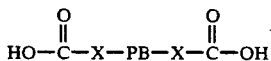

The statistical monofunctional carboxyl-terminated polymers will contain generally a small or minority amount of polymers generally represented by the structural formula

wherein Y is derived from a nonfunctional initiator. Regardless of the amounts of the various difunctional, or monofunctional carboxyl-terminated polymers, as well as the nonfunctional terminated polymers, the overall statistical monofunctional carboxyl-terminated polymeric compositions generally contain from about 0.25 to about 4.5 percent by weight of carboxyl groups based upon the total weight of the statistical polymeric composition and have an acid number of from about 3.0 to about 52.

The non-reactive terminus —Y of the molecule is referred to as such because it will not undergo condensation, as compared to the carboxyl terminus which will undergo that type of reaction. The composition of the terminus will vary depending upon the polymerization initiators used, however suitable groups include an alkyl or a nitrile.

The backbone —PB— of the statistical carboxyl-terminated polymer comprises repeating units made from any monomer which is polymerizable by any free radical reaction mechanism. The repeating unit composition of the polymer backbone may be made from a single monomer (homopolymer) or two or more monomers (copolymer). Preferably, the polymeric backbones are derived from at least one vinyl monomer having at least one terminal vinyl ($CH_2=$) group and up to 18 carbon atoms. Examples of suitable vinyl monomers include olefins having from 2 to 10 carbon atoms such as ethylene, isobutylene, dienes containing 4 to 10 carbon atoms, preferably 4 to 8 carbon atoms, such as butadiene, isoprene (2-methyl-1,3-butadiene), 2-isopropyl-1,3-butadiene and chloroprene (2-chloro-1,3-butadiene); vinyl and allyl esters of carboxylic acids containing 2 to 8 carbon atoms such as vinyl acetate, vinyl propionate and allyl acetate; vinyl and allyl ethers of alkyl radicals containing 1 to 8 carbon atoms such as vinyl methyl ether and allyl methyl ether; and acrylates having the formula

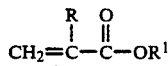

wherein R is hydrogen or an alkyl radical containing 1 to 3 carbon atoms, such as methyl, ethyl, propyl, and isopropyl; $R^1$ is an alkyl radical containing 1 to 18 carbon atoms, preferably 1 to 8 carbon atoms, or an alkoxyalkyl, alkylthioalkyl, or cyanoalkyl radical containing 2 to 12 carbon atoms, preferably 2 to 8 carbon atoms. Preferably, $R^1$ is an alkyl radical containing 1 to 8 carbon atoms. Suitable acrylates include ethyl acrylate, butyl acrylate, hexyl acrylate, 2-ethylhexyl acrylate, dodecyl acrylate, octadecyl acrylate, methoxyethyl acrylate, butoxyethyl acrylate, hexylthioethyl acrylate, α-cyanoethyl acrylate, cyanooctyl acrylate, methyl methacrylate, ethyl methacrylate, octyl methacrylate and the like. The polymeric backbone may comprise homopolymers of the above vinyl monomers or copolymers of two or more of the monomers.

The vinyl monomers described above may also be polymerized readily with up to about 50 percent by weight, but preferably up to about 35 percent by weight, of at least one comonomer such as a vinyl aromatic having the formula

wherein $R^2$ is hydrogen or methyl and $R^3$ is an aromatic moiety having from 6 to 15 carbon atoms resulting in compounds such as styrene, α-methyl styrene, chlorostyrene, and vinyl toluene; a vinyl nitrile having the formula

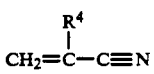

wherein $R^4$ is hydrogen or methyl, resulting in compounds such as acrylonitrile and methacrylonitrile, respectively; vinyl acids having from 3 to 12 carbon atoms such as acrylic acid, methacrylic acid, and itaconic acid; an amide of olefinically unsaturated carboxylic acids containing 2 to 8 carbon atoms such as acrylamide and methacrylamide; or an allyl alcohol having from 3 to 10 carbon atoms.

Examples of suitable polymeric backbones include homopolymers of polyisoprene, polybutadiene, poly(vinylethylether), poly(ethylacrylate) and poly(butylacrylate); copolymers of butadiene and acrylonitrile, butadiene and styrene, vinyl acetate and isoprene, vinyl acetate and chloroprene, methyl acrylate and butadiene, methyl acrylate and ethyl acrylate, methyl acrylate and butyl acrylate, methyl acrylate and 2-ethylhexyl acrylate, ethyl acrylate and ethylene, ethyl acrylate and isobutylene, ethyl acrylate and isoprene, ethyl acrylate and butadiene, ethyl acrylate and vinyl acetate, ethyl acrylate and styrene, ethyl acrylate and chlorostyrene, ethyl acrylate and n-butyl acrylate, ethyl acrylate and 2-ethylhexyl acrylate; ethyl acrylate and acrylic acid; ethyl acrylate and acrylamide; butyl acrylate and styrene; butyl acrylate and acrylonitrile; butyl acrylate and vinyl chloride; terpolymers of butadiene, acrylonitrile, and acrylic acid; ethyl acrylate, styrene and butadiene; and ethyl acrylate, n-butyl acrylate and 2-ethylhexyl acrylate.

One group of preferred low viscosity monofunctional carboxyl-terminated polymers have copolymeric backbones comprising from about 50 percent to about 99 or 100 percent by weight of a diene monomer, such as isoprene or butadiene, and up to about 50 percent by weight of a vinyl nitrile comonomer, such as acrylonitrile, or a vinyl aromatic such as styrene. The acrylonitrile content preferably is from about 10 percent to about 35 percent, desirably, is from about 16 percent to about 26 percent, and most preferably about 16 percent. Such polymers have a carboxyl content of from about 0.4 percent to about 10 percent by weight, preferably 0.4 percent to about 2.5 percent by weight, based upon the total weight of the polymer. These polymers have a number average molecular weight of from about 1000 to about 12,000.

The greatest advantage provided by these polymers is that their viscosity is approximately one-half (½) the value of an equivalent commercially known difunctional carboxyl-terminated polymer. This is demonstrated by the measured viscosities summarized in the following Table I, which compares the viscosity of the precursor statistical monofunctional polymers versus difunctional carboxyl-terminated polymers having the same compositions of butadiene homopolymers or butadiene/acrylonitrile copolymers.

Polymers "A" and "a" are homopolymers of butadiene while polymers B/b - D/d are butadiene/acrylonitrile copolymers. The polymer designations in upper case letters represent the precursor statistical monofunctional carboxyl-terminated polymers while the lower case letters represent structurally equivalent difunctional carboxyl-terminated polymers. The designation "EPHR" stands for Equivalents of Carboxyl Per Hundred Parts of Rubber.

TABLE I

Comparative Viscosity of Statistical Monofunctional vs. Difunctional Carboxyl Terminated Polymers

| Polymer | Acrylonitrile Content (% by weight) | Viscosity (mPa'S @ 27° C.) | Carboxyl EPHR |
|---|---|---|---|
| A | — | 22,600 | 0.022 |
| a | — | 60,000 | 0.045 |
| B | 10.2 | 30,600 | 0.025 |
| b | 10.2 | 60,000 | 0.050 |
| C | 16.8 | 65,000 | 0.022 |

TABLE I-continued

Comparative Viscosity of Statistical Monofunctional vs. Difunctional Carboxyl Terminated Polymers

| Polymer | Acrylonitrile Content (% by weight) | Viscosity (mPa'S @ 27° C.) | Carboxyl EPHR |
|---|---|---|---|
| c | 16.8 | 135,000 | 0.052 |
| D | 25.9 | 202,000 | 0.024 |
| d | 25.9 | 500,000 | 0.057 |

It will be appreciated by one skilled in the art that the viscosity of individual polymers will vary depending upon the monomeric composition of the polymeric backbone. However, generally the viscosity ranges from about 10,000 mPa's to about 1.5 million mPa's. For polymers of polybutadiene or polybutadiene and acrylonitrile wherein the acrylonitrile content ranges from 0 percent to about 50 percent by weight of the polymer, the viscosity ranges from about 12,000 mPa's to about 1.5 million mPa's, preferably 15,000 mPa's to about 1 million mPa's.

Thus, the above-described low viscosity statistical monofunctional carboxyl-terminated polymers which are generally liquids, are useful as a toughening and/or flexibilizing agent for any thermoset resin system. Thermoset resins include, but are not limited to, vinyl esters, epoxides, phenolics, alkyds and polyesters. Specific system applications can be at ambient temperatures and include those rich in resin and those rich in rubber. Resin rich system applications include one and two part adhesives, especially adhesives made of thermoset resins such as vinyl esters and epoxy, for uses including structural adhesives in the marine, automotive and aircraft industries; electrical and electronic potting compounds and encapsulants; cast pipe; sheet molding compound other than epoxy; and bulk molding compound. Castable rubber rich system applications include rocket and missile fuel binders; and construction and civil engineering applications including roofing, flooring, water-impermeable membranes, and crack sealers.

As discussed earlier hereinabove, the significantly lowered viscosity attaches substantial advantages over known difunctional polymers. Typically, the viscous difunctional polymers require warming to reduce their viscosity and render them more workable, especially in the field. The present precursor low viscosity statistical monofunctional polymers do not require warming prior to use and will be preferred for applications which must be performed at relatively lower ambient temperatures. Additionally these polymers provide faster air release and better mixing. Therefore, these polymers will be preferred for applications involving mixing, which tends to entrap air, which must then be released before continuing, such as with on-site structural repair jobs.

These polymers have further utility in that they also may be reacted to produce polymers having terminal functional groups other than carboxyls, such as amines or epoxies.

The statistical monofunctional carboxyl-terminated polymer can be made by any conventional addition polymerization technique employing a free radical mechanism. Generally, the reaction is conducted by mixing one or more backbone-forming monomers with a mixture of a difunctional and nonfunctional initiator, and a solvent, then heating. The monomers can be one or more of the polymerizable monomers described hereinabove.

The initiator is a mixture or blend of two different initiators, namely a difunctional initiator and a nonfunctional initiator, capable of initiating a free radical polymerization.

Considering the difunctional initiator, any difunctional initiator can be used. However, one skilled in the art will appreciate that when a difunctional initiator other than an organic acid is used, conversion of the terminal groups to acid groups will be required. For example, the hydroxyl groups on hydrogen peroxide or hydroxy ethyl disulfide require conversion to acid groups. Conventional methods may be used to accomplish the conversion such as by reaction with a cyclic acid anhydride, for example succinic anhydride. Preferably the difunctional initiator is an organic azo compound or a peroxide. The organic azo initiator preferably is a bis-azocyano acid having the formula

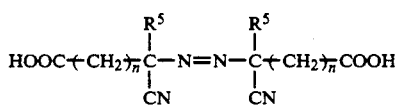

wherein $R^5$ is an alkyl group of 1-3 carbon atoms, and n is an integer from 0 to 6. The preferred acids include azodicyanobutyric acid and azodicyanovaleric acid (ADVA), with ADVA being the most preferred. The preparation of these materials is known and disclosed in U.S. Pat. Nos. 3,285,949 and 2,520,338, which are incorporated herein by reference. The organic azo initiator decomposes to form $N_2$ gas and free radicals having the formula

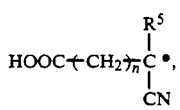

with the portion thereof having the structural formula

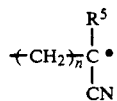

being represented by —X— in the structural formula shown above for the monofunctional carboxyl-terminated polymer. The action of this type of initiator is due to the fact that the azo carbon-nitrogen bond is readily dissociated, as by thermal means.

The preferred difunctional peroxide initiator has the formula

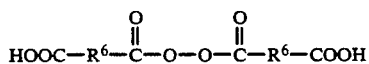

wherein $R^6$ is an alkyl group having from about 2 to about 6 carbon atoms, and preferably 3 carbon atoms. A desirable peroxide is succinic acid peroxide and a preferred peroxide is glutaric acid peroxide. The difunctional peroxide initiator decomposes to form $CO_2$ gas and free radicals having the formula

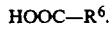

wherein $R^6$ is represented by X in the structural formula shown above for the monofunctional carboxyl-terminated precursor polymer. The action of this type of initiator is due to the fact that the peroxide oxygen-oxygen bond is readily dissociated, as by thermal means.

Considering the nonfunctional initiator, any nonfunctional azo or peroxide initiator can be used. Preferably the azo initiator is a bis-azocyano having the formula

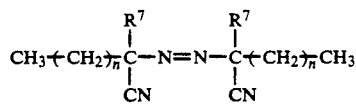

wherein $R^7$ is an alkyl group of 1-3 carbon atoms and n is an integer from 0 to 6. Such compounds are known and disclosed in U.S. Pat. No. 2,556,876. The preferred compound is 2,2'-azobis(2-methylpropionitrile) also known as AIBN. The azo initiator decomposes to form $N_2$ gas and free radicals having the formula

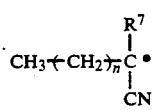

which is represented by —Y as the non-reactive terminus of the precursor monofunctional carboxyl-terminated polymer described above. The action of this type of initiator also is due to the fact that the azo carbon-nitrogen bond is readily dissociated, as by thermal means.

The nonfunctional peroxide initiator preferably is an acyl peroxide having the formula

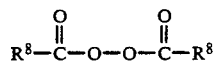

wherein $R^8$ is an aromatic, or an unsubstituted or a substituted alkyl group desirably having from about 1 to about 15 and preferably from about 1 to about 6 carbon atoms. Desirable peroxides include diacetyl peroxide, dilauryl peroxide, didecanoyl peroxide, and diisononanoyl peroxide, with dibenzoyl peroxide being preferred. The nonfunctional peroxide initiator decomposes to form $CO_2$ gas and free radicals having the formula $R^8$ which also is represented by Y as the non-reactive terminus of the precursor monofunctional carboxyl-terminated polymer described above. The action of this type of initiator is also due to the fact that the peroxide oxygen-oxygen bond is readily dissociated, as by thermal means.

The amount of initiators present, on a mole basis, may vary from about 0.2 percent to about 90 percent difunctional initiator and from about 10 percent to about 99.8 percent nonfunctional initiator. Preferably from about 30 percent to about 75 percent difunctional initiator is used in combination with from about 70 percent to about 25 percent nonfunctional initiator. Most preferred is from about 60 percent to about 40 percent difunctional initiator in combination with from about 40 percent to about 60 percent nonfunctional initiator. As noted, one skilled in the art will appreciate that the monofunctional polymer product is a blend or mixture of molecules having different end groups, namely a monofunctional species, a difunctional species and a nonfunctional species. When the ideal 50/50 blend of difunctional and nonfunctional initiators is used, it is expected that statistically one obtains, by weight, from about 5 percent to about 90 percent difunctional specie, from about 90 percent to about 5 percent nonfunctional specie, and about 5 percent to about 5 percent monofunctional specie; desirably from about 10 percent to about 50 percent difunctional specie, from about 10 percent to about 50 percent nonfunctional specie, and up to about 50 percent monofunctional specie; and preferably about 25 percent difunctional specie, about 25 percent nonfunctional specie and about 50 percent monofunctional specie. When other ratios of difunctional and nonfunctional initiators are utilized, it will be appreciated that the end amount of the nonfunctional terminated polymer as well as the difunctional terminated polymer will generally vary in accordance with the ratio of the difunctional polymer to the nonfunctional polymer, but that the amount of the monofunctional specie will generally be no higher than 50 percent. However, as noted above, the blend or mixture of the statistical monofunctional carboxyl-terminated polymer desirably has an average functionality per polymer of approximately 1.

The liquid polymerization products can be prepared in any solvent for the initiators, the monomers or the polymers. The solvent is desirably low boiling so it can be readily removed. Such solvents are generally polar and do not act as chain transfer agents. Examples of such solvents include the various ketones having from 2 to about 10 carbon atoms, various alcohols having from 1 to about 7 carbon atoms, various aromatic compounds having from about 6 to about 10 carbon atoms, various esters of a carboxylic acid wherein the ester portion has up to about 4 carbon atoms and the dicarboxylic acid has from about 2 to about 3 or 4 carbon atoms in the non-ester portion, and various ethers including internal ethers having from about 3 to about 7 carbon atoms. Specific examples of suitable solvents include acetone, methyl ethyl ketone, 2-pentanone, 3-pentanone, methyl isobutyl ketone, methyl alcohol, ethyl alcohol, n-propyl alcohol, isopropyl alcohol, butyl alcohol, isobutyl alcohol, sec-butyl alcohol, tert-butyl alcohol, benzene, toluene, methyl acetate, ethyl acetate, propyl acetate, and tetrahydrofuran. Acetone is preferred. The reaction temperature may range from about 40° C. to about 120° C., desirably 60° C. to about 100° C., and preferably from about 70° C. to about 90° C. The number average molecular weight (Mn) of the precursor statistical monofunctional carboxyl-terminated polymers ranges from about 1,000 to about 12,000, based upon size exclusion chromatography method of determination.

Those skilled in the art will appreciate that in order to form a polymer having uniform composition throughout the charge and maintain constant molecular weight over the length of the polymerization, the initiator, and comonomer if copolymerizing, must be continuously metered throughout the polymerization. Therefore, the statistical monofunctional carboxyl-terminated polymers are made by a method whereby initially, the reactor is charged with monomer, and a small amount of initiator mixture and comonomer if copolymerizing, and all of the polymerization solvent. The exact amounts of monomers and initiator will vary depending upon the product polymer, however, the amounts can be readily determined experimentally by conventional methods of calculation. Then, after bringing the reaction mixture to reaction temperature, more initiator, and comonomer if copolymerizing, are added during polymerization such that they are continuously metered including incremental addition or a plurality of batch additions, etc. throughout polymerization. Conventional procedures including incremental addition or a plurality of batch additions can be used to recover the resulting reaction products.

No emulsifier is necessary for this process. After polymerization it may be desirable to add conventional additives to the polymer, depending upon its end use, such as thermal stabilizers, including Geltrol ® commercially available from The B. F. Goodrich Company, Akron, Ohio, U.S.A.

The above-described process for forming the statistical monofunctional carboxyl-terminated polymer will be better understood by the following examples.

EXAMPLE 1

The statistical monofunctional carboxyl-terminated polymer was obtained in the following experiment. A 20 gallon reactor was cooled to 25° C. and evacuated to suck in 2.08 Kg acrylonitrile, 6.12 Kg acetone and 0.99 Kg initiator solution, in sequence. The initiator solution concentration Was 10.3 percent ADVA and 6.03 percent AIBN. The reactor was evacuated until the acetone boiled (about 20–25" Hg), then pressured to 20 psi with nitrogen. This was repeated and the reactor once again evacuated to 20" Hg. The vacuum was broken by charging 38.0 lbs. of butadiene. The mixture was heated to reaction temperature of 85° C. and allowed to react for approximately 13 hours. During polymerization, additional initiator mixture and acrylonitrile were metered into the reaction vessel. Conventional techniques were used to recover the product which had an acid number of 12.9, viscosity at 27° C. of 65,000 mPa's and a bound acrylonitrile content of 16.5 percent.

EXAMPLE 2

The statistical monofunctional carboxyl-terminated polymer was obtained in the following experiment. A 15 gallon reactor was cooled to 25° C. and evacuated to suck in 3.52 Kg acrylonitrile, 5.58 Kg acetone and 2.72 Kg initiator solution, in sequence. The initiator solution concentration was 8.0 percent ADVA and 4.7 percent AIBN. The reactor was evacuated until the acetone boiled (about 20–25" Hg), then pressured to 20 psi with nitrogen. This was repeated and the reactor once again evacuated to 20" Hg. The vacuum was broken by charging 30.22 lbs. of butadiene. The mixture was heated to reaction temperature, 75° C. and allowed to react for approximately 26 hours. During polymerization, additional initiator mixture and acrylonitrile were metered into the reaction vessel. Conventional techniques were used to recover the product which had an acid number of 13.3, viscosity at 27° C. of 202,000 mPa's and a bound acrylonitrile content of 25.9 percent.

Physical property evaluations conducted on polymer samples to compare the performance of the statistical monocarboxyl-terminated polymers to conventional dicarboxyl-terminated polymers in a model two-part epoxy system generally showed that for epoxy recipes containing up to 10 parts polymer, the statistical monocarboxyl-terminated polymers exhibited comparable or superior fracture energies ($G_{Ic}$) to those observed in the conventional dicarboxyl-terminated polymers.

Another suitable RLP additive for use in the present invention is difunctional carboxyl-terminated butadiene-acrylonitrile-acrylic acid type terpolymer which was described hereinabove for the formation of the prereacted vinyl ester base resin, with the foregoing description hereby being fully incorporated by reference.

Still other suitable elastomers which can be utilized as RLP additives in the present invention are epoxy-terminated type polymers, with the statistical difunctional form thereof being fully described in U.S. Pat. No. 4,530,962 which is hereby fully incorporated by reference. The nonfunctional butadiene-acrylonitirle copolymer is well known to the art and to the literature.

With regard to the statistical monofunctional form of the epoxy-terminated reactive liquid polymer, the precursor statistical monofunctional carboxyl-terminated polymer is once again utilized. The preparation, structure, formulation, and the like of the statistical carboxyl-terminated prepolymer is set forth hereinabove and accordingly is fully incorporated by reference with regard to the structure, formulation, and preparation thereof. Inasmuch as the statistical epoxy-terminated polymer composition is prepared by reacting one or more epoxy resins as set forth hereinbelow with a statistical monofunctional carboxyl-terminated polymer composition, the actual composition will contain various monofunctional epoxy-terminated polymers which can be represented by the general structural formula

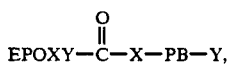

various difunctional polymers which can be represented by the general structural formula $$\text{EPOXY}-\overset{\overset{O}{\|}}{C}-X-PB-X-\overset{\overset{O}{\|}}{C}-\text{EPOXY},$$

and various nonfunctional polymers which can be represented by the general structural formula Y—PB—Y, wherein X, PB, and Y are as set forth hereinabove, and wherein EPOXY is an epoxy resin which is reacted with the statistical monofunctional carboxyl-terminated polymer composition. Naturally, it is to be understood that during reaction with the statistical monofunctional carboxyl-terminated composition, ring opening reaction takes place. The reaction between the epoxy resin and the statistical monofunctional carboxyl-terminated polymer composition which will be described in more detail hereinbelow generally takes place in the presence of an inert atmosphere at elevated temperatures utilizing small amounts of catalysts.

Considering the "EPOXY" group, it is generally an epoxy resin usually known to the art and to the literature and can be various commercially available epoxy resins. Examples of specific epoxy resins or polymers which can be utilized include: polyhydric phenol polyether alcohols; glycidyl ethers of novolac resins such as epoxylated phenol-formaldehyde novolac resin; glycidyl ethers of mono-, di-, and trihydric phenols; glycidyl ethers of bisphenols such as diglycidyl ether of tetrabromobisphenol A; glycidyl ethers of polynuclear phenols; epoxy resin made from diphenolic acid; glycidyl ethers of aliphatic polyols such as chlorine-containing aliphatic diepoxy and polyepichlorohydrin; glycidyl esters such as aliphatic diacid glycidyl esters and epoxidized phenolphthalein; glycidyl epoxies containing nitrogen such as glycidyl amides and amide-containing epoxies; glycidyl derivatives of cyanuric acid; glycidyl resins from melamines; glycidyl amines such as triglycidyl ether amine of p-aminophenol and bis(2,3-epoxypropyl)methylpropylammonium p-toluenesulfonate; glycidyl triazines; thioglycidyl resins such as epoxidized bisulfide; silicon-glycidyl resins such as 1,4-bis[(2,3-epoxypropoxy)dimethylsilyl]; and fluorine glycidyl resins. Other epoxy resins which can be used include those which are synthesized from mono-epoxies other than epihalohydrins including epoxy resins made from unsaturated monoepoxies such as polyallyl glycidyl ether and glycidyl sorbate dimer; epoxy resins from monoepoxy alcohols; epoxy resins from monoepoxies by ester interchange; epoxy resins from glycidaldehyde; polyglycidyl compounds containing unsaturation such as allyl-substituted diglycidyl ether of bisphenol A; epoxy resins which are synthesized from olefins and chloroacetyls such as butadiene dioxide, vinylcyclohexene dioxide, epoxidized polybutadiene, and bis(2,3-epoxycyclopentyl)ether, and epoxy-resin adducts of the above. A more comprehensive list of epoxy resins can be found in *Handbook of Epoxy Resins*, by Henry Lee and Kris Neville, McGraw-Hill, Inc., 1967, which is hereby incorporated by reference. A highly preferred epoxy resin for use is diglycidyl ether of bisphenol A (DGEBA) which has the following formula:

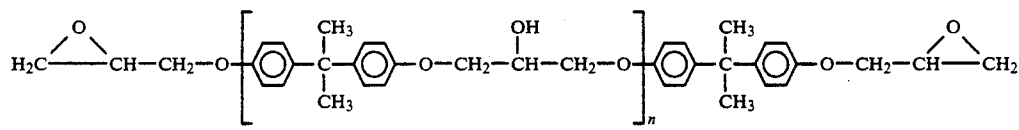

wherein n is an integer from 0 to 18, desirably from 0 to 14.3, and preferably from 0 to 5.5.

The various epoxy resins or polymers generally have a number average molecular weight of from about 200 to about 13,000. The various epoxy polymers generally are difunctional, that is, they have two epoxide groups typically at the terminal portions thereof. The amount of the epoxy resin utilized is such that the mole ratio of epoxy resin to the statistical carboxyl-terminated monofunctional polymer is generally in excess, as from about 0.90 to about 40, desirably from about 0.90 to about 20, and preferably from about 0.95 to about 1.05. Thus, free epoxy resins will generally exist within the reacted statistical monofunctional epoxy-terminated reactive liquid rubber polymeric compositions.

Reaction of the various epoxy resins or polymers with the statistical carboxyl-terminated reactive polymers generally occurs at elevated temperatures in the presence of an inert atmosphere. Generally, any inert gas can be utilized such as nitrogen, argon, and the like. The reaction generally occurs at temperatures of from about 80° C. to about 180° C, desirably from about 90° C. to about 140° C., and preferably from about 90° C. to about 120° C., generally in the presence of ambient or normal atmospheric temperature. In order to promote reaction, conventional epoxy catalysts are optionally utilized.

One group of catalysts which can be utilized are the various organic phosphines having from 3 to 40 carbon atoms which include various alkyl, various aromatic, various alkyl substituted aromatic, etc., phosphines such as triphenyl phosphine, diethylphenylphosphine, dimethylphenylphosphine, tribenzyl phosphine, tri-n-butylphosphine, tri-t-butylphosphine, tricyclohexylphosphine, triethylphosphine, trimethylphosphine, tri-n-octylphosphine, triphenylphosphine, tris(3-chlorophenyl)phosphine, tris(4-chlorophenyl)phosphine, tris(4-fluorophenyl)phosphine, tris(2-hydroxyphenyl)phosphine, tris(3-methoxyphenyl)phosphine, tris(4-methoxyphenyl)phosphine, tris(2-tolyl)phosphine, and tris(3-tolyl)phosphine. A second type of catalyst are the various tertiary amines wherein the hydrocarbyl portion is generally an aliphatic and preferably an alkyl group, an aromatic group, or an aliphatic substituted aromatic, or an aromatic substituted aliphatic group, having a total of from about 1 to about 10 carbon atoms with from about 1 to about 6 carbon atoms being preferred. Examples of specific tertiary amine catalysts include benzyl dimethyl amine, trimethyl amine, triethylamine, and the like. Another group of suitable catalysts are the various alkyltriphenylphosphonium ester or halide salts wherein the alkyl group generally has from 1 to about 10 carbon atoms, and wherein iodide is the preferred halide salt. Examples of such specific catalysts include ethyltriphenylphosphonium acetate, ethyltriphenylphosphonium iodide, n-hexyltriphenylphosphonium bromide, isobutyltriphenylphosphonium bromide, isopropyltriphenylphosphonium bromide.

As noted, although generally desired, the catalysts are optional and hence may not be utilized. When utilized, the amount thereof is generally up to about 1 percent by weight based upon a total weight of the epoxy resin and the statistical monofunctional carboxyl-terminated reactive polymer, desirably up to about 0.5 percent by weight, and preferably from about 0.001 to about 0.1 percent by weight.

In order to reduce the level of residual reactions, the formed monofunctional epoxy-terminated reactive polymers desirably have a low acid number, such as 2.0 or less, and preferably 0.4 or less. Moreover, the epoxy-terminated reactive polymers also have very low viscosities, such as generally less than 2,000,000 mPa's, desirably 1,000,000 mPa's or less, and preferably 500,000 mPa's or less.

Inasmuch as the epoxy resins react with available carboxyl-terminated functional end groups, the overall make-up or content of the statistical epoxy-terminated reactive liquid rubber polymers will generally contain the same ratios or amounts of reactive epoxy-terminated end groups as the statistical carboxyl-terminated polymers. Thus, if the statistical carboxyl-terminated polymers are made utilizing approximately 50 percent of a difunctional initiator and 50 percent of a nonfunctional initiator, the statistical epoxy-terminated polymers will contain generally from about 5 percent to about 90 percent of the difunctional specie, from about 90 to about 5 percent of the difunctional specie, and from about 5 percent to about 50 percent of the monofunctional specie; desirably from about 10 to about 50 percent of the difunctional specie, from about 10 to about 50 percent of the nonfunctional specie, and up to about 50 percent of the monofunctional specie; and preferably about 25 percent of the difunctional specie, about 25 percent of the nonfunctional specie, and about 50 percent of the monofunctional specie. Hence, as noted above, it is termed a statistical epoxy-terminated monofunctional reactive liquid rubber polymer composition.

The ratios of the various species of the statistical polymer will vary depending upon the amount of initiators generally utilized and hence the amount of the difunctional or nonfunctional species can vary widely with the amount of the monofunctional specie can generally not be greater than 50 percent.

The statistical epoxy-terminated monofunctional polymers are generally liquid but can also be solid and have significantly lower viscosities than heretofore conventional but difunctional epoxy-terminated polymers, which render them more workable, especially in the field. Suitable applications include ambient temperature use as well as use in association with vinyl ester resins and epoxy resins as structural adhesives in the marine, automotive, and aircraft industries; electrical and electronic prodding compounds and encapsulants; cast pipe; sheet molding compounds, boat molding compounds, and the like. They can also be utilized as castable systems in construction and civil engineering applications such as roofing, flooring, water-impermeable membranes, cracks sealers, and the like.

The formation of the statistical monofunctional epoxy-terminated polymer will be better understood by reference to the following examples.

EXAMPLE 3

To a suitably sized reaction vessel was charged 400 grams of polymer C and 34.7 grams of Epon 828, that is, DGEBA, at a molar ratio of approximately 1:1. 0.05 grams of triphenyl phosphine was added as a catalyst. In the presence of a nitrogen blanket, the temperature of the reaction vessel was raised to approximately 130° C. and the reaction continued until the acid number was generally less than 0.6. The reaction time was approximately 20 hours to reach completion. The statistical epoxy-terminated reactive polymer had a viscosity of 339,000 mPa's at 27° C. In contrast, a similar reaction utilizing a difunctional carboxyl-terminated reactive polymer yielded a viscosity in excess of 2,000,000.

EXAMPLE 4

An epoxy-terminated reactive polymer was made utilizing the same procedure as in Example 3 except that Polymer D and 600 grams of Epon 828 was utilized. The molar ratio was thus approximately 17.3. No catalyst was utilized and the reaction was completed in about 4.5 hours. The statistical epoxy-terminated reactive polymer had a viscosity of 91,000 mPa's at 27° C. In contrast, a control utilizing the same reactants and amounts except that a difunctional carboxyl-terminated reactive polymer was utilized, yielded a product having a viscosity of from about 300,000 to about 600,000 mPa's at 25° C.

EXAMPLE 5

In a suitably sized reaction vessel was added equal parts by weight of polymer D and the diglycidyl ether of cyclohexane dimethanol. Under a blanket of nitrogen, the reaction temperature was raised to 130° C. and reacted until the Acid No. was <0.6. The reaction required 4.5 hours to reach completion. The final product had a viscosity of 8600 mPa's at 27° C. (The same reaction with a standard difunctional RLP gives an adduct with a viscosity of 15,000–25,000 mPa's at 25° C.) Molar Ratio RLP/Epoxy—1:8.6

EXAMPLE 6

In a suitably sized reaction vessel was added 200 parts by weight of polymer D and 300 parts of an epoxy novolac (such as DEN-438). Under a blanket of nitrogen was added 2.5 grams (0.5 weight percent) of phosphonium iodide and the reaction temperature was raised to 100° C. The reaction required only 1 hour to reach the desired end point of no titratable acid. The final adduct had a viscosity of 160,000 mPa's at 50° C. and 1,980,000 mPa's at 27° C. (There is no comparable adduct with a difunctional RLP).

Another RLP found suitable for admixing as an additive into the prereacted vinyl ester resin starting material utilized in the present invention, is the statistically difunctional hydroxyl-terminated epihalohydrin type polymer having a number average molecular weight of about 3300, which is described in U.S. Pat. No. 3,850,856 and is hereby fully incorporated by reference.

Still other suitable RLPs found useful for admixing as an additive into the prereacted vinyl ester base resin are the vinylidene-terminated type polymers described in U.S. Pat. No. 3,910,992, which is hereby fully incorporated by reference.

Epoxy-terminated butadiene-acrylonitrile type copolymer additive containing 17 percent or 26 percent bound acrylonitrile is preferred for admixing into the prereacted vinyl ester resin starting material in the present invention. It is understood that other RLPs can be utilized for admixing as an additive into the prereacted vinyl ester base resin, including but not limited to, RLPs having functional groups substituted along the backbone of the polymer rather than on the ends thereof as described above.

A selected one of the above-described RLP additives or a blend of the statistically different forms thereof are admixed with the prereacted vinyl ester base resin to form the modified vinyl ester resin composition of the present invention in the following manner.

In accordance with another of the main features of the present invention, the selected RLP additive is admixed in a conventional manner with the prereacted vinyl ester base resin and a suitable curing agent is added to the RLP/base resin admixture. Although addition of the RLP additive preferably occurs prior to cure of the base resin, it is understood that the RLP additive could be admixed into the resin system during cure in the presence of heat without affecting the concept of the present invention. From about 2 to about 30 parts, desirably from about 2 to about 20 parts, and preferably from about 2 to about 10 parts of the RLP additive based on 100 parts of the base resin, is admixed with the base resin. It is well known to the art and to the literature that addition of amounts of the RLP additive greater than about 30 parts per 100 parts of the base vinyl ester resin would result in reduction in the thermomechanical properties of the base resin.

Suitable curing agents include free radical curing agents such as free radical peroxides which are well known to those skilled in the art. Such curing agents are utilized in an amount of from about 0.5 to about 4 parts, and preferably from about 1 to about 2 parts per 100 parts of the base resin. The system then is cured in a conventional Teflon ®-coated aluminum mold and heated for 1 hour at from about 40 to about 80° C. with 60° C. being preferred, and then for an additional 2 hours at from about 100 to about 150° C. with 120° C. being preferred.

In accordance with one of the key features of the present invention, although not being fully understood, it is believed that admixture of the RLP additive with the prereacted vinyl ester base resin and subsequent heating during cure of the resin system causes the RLP additive to miscibilize or become uniformly dispersed with the base resin, thus generally preventing phase separation of the RLP additive and the base resin. More particularly, it is thought that the rubber particles of the RLP additive physically associate or affiliate with the rubber particles previously reacted into the backbone of the base resin due to the similarity and polarity of the elastomers, and further due to thermodynamic factors which occur during mixing of the free RLP into the base resin and heating of the resin system during cure. Moreover, it is thought that the prereaction of the carboxyl-terminated type RLP with the epoxy component of the vinyl ester also aids in miscibility between the rubber particles prereacted into the backbone of the vinyl ester resin and the free or unreacted additive rubber particles subsequently admixed into the resin system. Again, it is thought that the rubber particles of the RLP additive merely physically associate or affiliate with the rubber particles reacted into the backbone of the base resin, rather than react therewith, so that such additive rubber particles are considered to be free or unreacted upon admixture into the base resin. Curing of the admixed resin system in the presence of a suitable curing agent and heat results in the modified vinyl ester resin system of the present invention, which is a crosslinked thermoset system.

Figure 5:
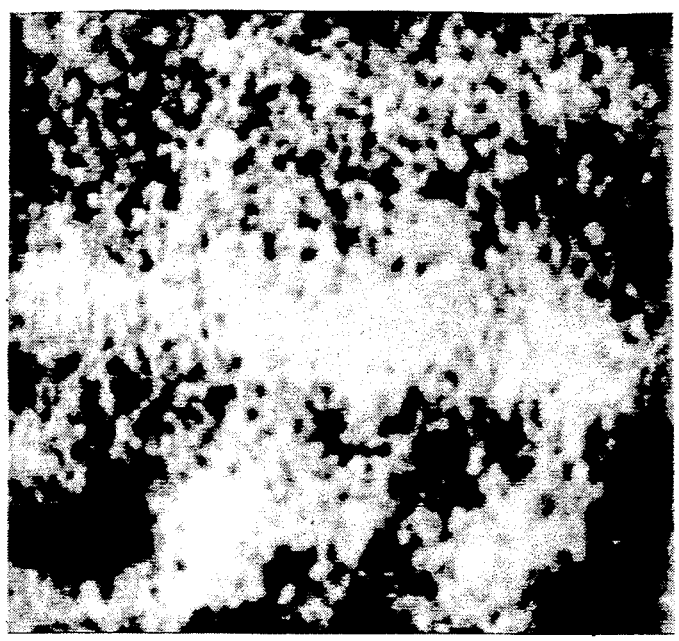
FIG. 5 is a stained transmission electron microscopy micrograph of Derakane 8084 (Derakane being a registered trademark of the Dow Chemical Company of Midland, Mich.), magnified 66,800 times.
Figure 6:
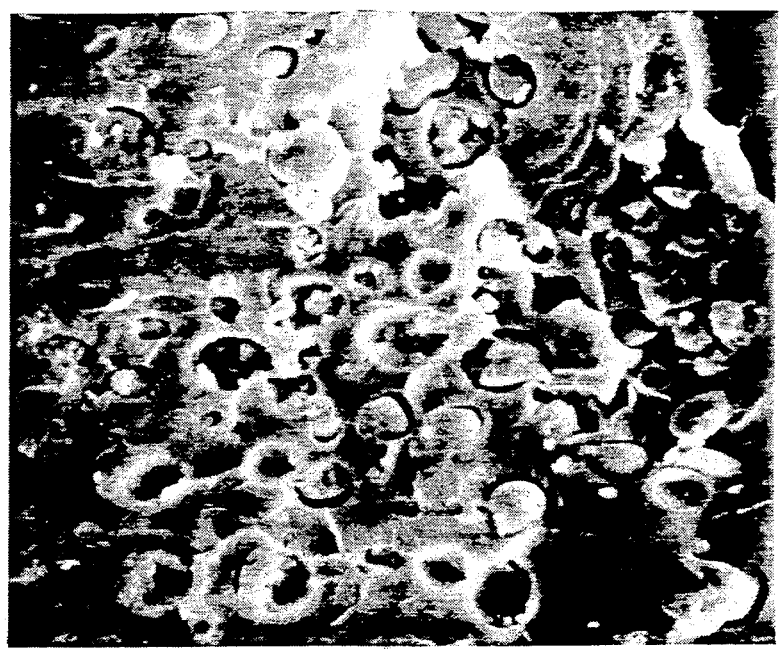
FIG. 6 is a scanning electron microscopy micrograph of 20 percent by weight of epoxy-terminated butadiene-acrylonitrile type copolymer additive containing 17 percent bound acrylonitrile, admixed with Derakane 411 and magnified 300 times.
Figure 7:
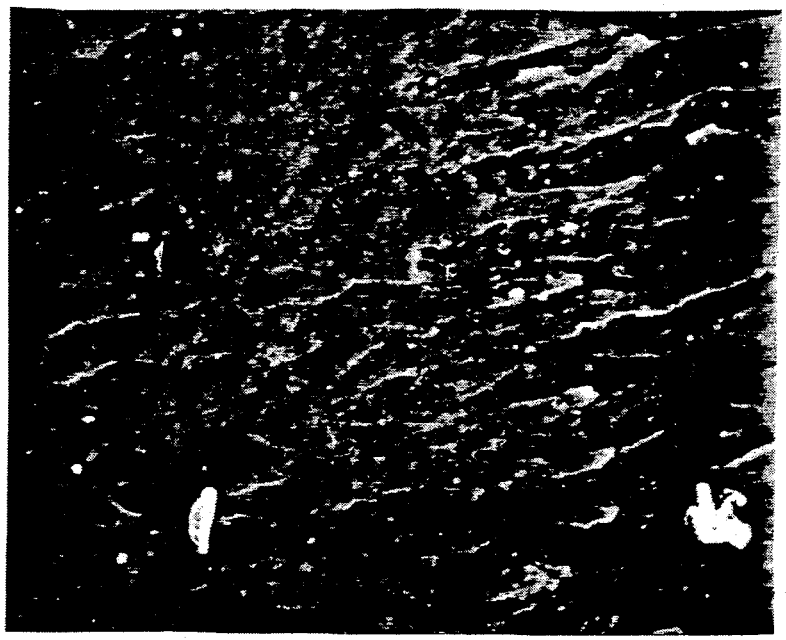
FIG. 7 is a scanning electron microscopy micrograph of 5 percent by weight of epoxy-terminated butadiene-acrylonitrile type copolymer additive containing 17 percent bound acrylonitrile, admixed with Derakane 8084 and magnified 300 times.

In accordance with yet another feature of the present invention, admixture of the RLP additive with the prereacted vinyl ester base resin and heating of the resin system during cure thereof enables the morphology of the modified vinyl ester resin composition of the present invention to be controlled. More particularly, the modified vinyl ester resin product of the present invention must contain small particles to be effective in many contemplated end use applications. Small particles are produced as a result of the physical association or affiliation of the additive rubber particles with the rubber particles previously reacted into the backbone of the base resin. Such small particles have a size of less than 10,000 angstroms, and preferably less than 1,000 angstroms. The presence of small particles allows shear flow and shear yielding to occur in the vinyl ester resin. Thus, unexpectedly good improvement in toughness or fracture energy ($G_{Ic}$) are observed in the modified vinyl ester resin product. It is understood that large particles may be present together with such small particles resulting in a bimodal morphological or particle size distribution. However, if too many large particles are present or if such large particles exceed 500,000 angstroms, it is believed that such large particles would serve as flaws in the modified vinyl ester resin product thereby reducing its toughness. Morphological comparisons are made in FIGS. 5 through 7, with FIGS. 5 and 6 showing vinyl ester resins modified by the prior art methods of adduction and admixture, respectively, and containing more large particles than observed in FIG. 7 which illustrates the modified vinyl ester resin composition of the present invention.

The invention will be better understood by reference to the following examples which do not serve to limit the invention.

EXAMPLE 7

The recipes set forth below in Table II were prepared in the following manner. An epoxy-terminated butadiene-acrylonitrile type copolymer additive containing 17 percent bound acrylonitrile, which is sold commercially as a 50 percent solution in styrene by the B. F. Goodrich Company of Akron, Ohio under the label ETBN X40, was admixed with Derakane 411 vinyl ester base resin in Recipes 2 through 4. Derakane 411 is a vinyl ester resin having no rubber content. Cobalt napthenate and methylethyl ketone peroxide curing agent then were added to the mixture which was placed in teflon-coated aluminum molds to a sample thickness of about ¼ inch. All recipes were cured for one hour at 60° C. and subsequently for 2 hours at 120° C. Table II also sets forth the total rubber content of the modified Derakane 411 system. Mechanical properties were measured using ASTM procedure D-638, and fracture energies were measured using ASTM procedure E-399 using a compact tension specimen. Glass transitions (Tg) were measured using a Metler DSC instrument.

TABLE II

| | RECIPES | | | |
|---|---|---|---|---|
| | 1 | 2 | 3 | 4 |
| DERAKANE 411 | 100 | 100 | 100 | 100 |
| ETBN X40 (17% bound acrylonitrile) | 0 | 10 | 20 | 30 |
| Cobalt Nap. | 0.5 | 0.5 | 0.5 | 0.5 |
| MEK Peroxide | 2 | 2 | 2 | 2 |
| Tot. Rubber Content | 0 | 4.2 | 8.3 | 12.5 |
| PROPERTIES AFTER CURING 1 HR. @ 60° C. + 2 HRS. @ 120° C. | | | | |
| Ten. Stg., psi | 4450 | 7750 | 6920 | 4000 |
| Elongation, % | 1.28 | 3.67 | 4.67 | 2.30 |
| Modulus, GPa | 3.10 | 2.41 | 1.82 | 1.730 |
| $K_{Ic}$, MN/m$^{3/2}$ | 0.610 | 1.150 | 1.24 | 1.420 |
| $G_{Ic}$, kJ/m$^2$ | 0.107 | 0.485 | 0.742 | 1.030 |
| Tg, °C. | 118 | 121 | 119 | 119 |

The data in Table II shows about a 9 to 10 gold increase in fracture energy $G_{Ic}$ from the unmodified Derakane 411 resin of recipe 1 which is free of rubber, to one that contains 12.5 parts per 100 parts of the base resin rubber content of recipe 4.

EXAMPLE 8

The recipes set forth below in Table III were prepared and tested in the same manner as the recipes of Table II of Example 7.

TABLE III

| | RECIPES | | | | |
|---|---|---|---|---|---|
| | 5 | 6 | 7 | 8 | 9 |
| DERAKANE 8084 | 100 | 100 | 100 | 100 | 100 |
| ETBN X40 (17% Bound Acrylonitrile) | 0 | 5 | 10 | 15 | 20 |
| Cobalt Nap. | 0.5 | 0.5 | 0.5 | 0.5 | 0.5 |
| MEK Peroxide | 2 | 2 | 2 | 2 | 2 |
| Tot. Rubber Cont. | 7.5 | 9.6 | 11.7 | 13.7 | 15.8 |
| PROPERTIES AFTER CURING 1 HR. @ 60° C. + 2 HRS. @ 120° C. | | | | | |
| Ten. Stg., psi | 6900 | 7760 | 6470 | 6130 | 4920 |
| Elongation, % | 2.03 | 6.10 | 3.66 | 6.81 | 4.27 |
| Modulus, GPa | 2.62 | 2.66 | 2.08 | 2.26 | 1.72 |
| $K_{Ic}$, MN/m$^{3/2}$ | 1.13 | 1.87 | 1.97 | 2.12 | 1.99 |
| $G_{Ic}$, kJ/m$^2$ | 0.427 | 1.16 | 1.65 | 1.77 | 2.04 |
| Tg, °C. | 113 | 114 | 109 | 121 | 113 |

The data of Table III shows improvements in fracture energy for ETBN RLP additive admixed with Derakane 8084, which is a vinyl ester resin having an RLP already reacted into the polymer backbone, over those for Derakane 411 set forth in Table II of Example 7. More particularly, recipes 7 and 8 of Table III contrasted with recipe 4 of Table II each show over a 1.5 fold increase in fracture energy for RLP additive admixed with Derakane 8084 compared to admixture with Derakane 411, for generally similar total rubber contents in the respective vinyl ester resin systems. The data in Table II also shows from about at least a two-fold increase up to nearly a five-fold increase in fracture energy values for the various recipes 6 through 9 of Derakane 8084 having an RLP additive admixed therewith, over recipe 5 for Derakane 8084 having no RLP additive admixed therewith wherein its total rubber content being attributed to the RLP reacted into the backbone of the vinyl ester resin. Moreover, the data show that mechanical property retention is also better for recipes of Derakane 8084 having an ETBN additive as compared to recipes of Derakane 411 having the same additive at similar total rubber levels.

EXAMPLE 9

The receipes set forth below in Table IV were prepared and tested in the same manner as set forth in Example 7 above.

TABLE IV

| | RECIPES | | | |
|---|---|---|---|---|
| | 10 | 11 | 12 | 13 |
| DERAKANE 8084 | 100 | 50 | 50 | 50 |
| DERAKANE 411 | 0 | 50 | 50 | 50 |
| ETBN X40 (17% Bound Acrylonitrile) | 0 | 9 | 15 | 21 |
| Cobalt Nap. | 0.5 | 0.5 | 0.5 | 0.5 |
| MEK Peroxide | 2 | 2 | 2 | 2 |
| Tot. Rubber Cont. | 7.5 | 7.5 | 10.0 | 12.5 |
| PROPERTIES AFTER CURING 1 HR. & 60° C. + 2 HRS. @ 120° C. | | | | |
| Ten. Stg., psi | 7175 | 7190 | 5800 | 5090 |
| Elongation, % | 2.34 | 6.29 | 5.11 | 5.55 |
| Modulus, GPa | 2.585 | 1.94 | 1.76 | 1.46 |
| $K_{Ic}$, MN/m$^{3/2}$ | 1.115 | 1.46 | 1.67 | 1.61 |
| $G_{Ic}$, kJ/m$^2$ | 0.423 | 0.969 | 1.40 | 1.57 |
| Tg, °C. | 113 | 117 | 118 | 118 |

The data set forth above in Table IV shows that a 50/50 blend of Derakane 8084 and Derakane 411 containing ETBN X40 additive as shown in recipe 11 gives at least a twofold increase in fracture energy over Derakane 8084 of receipe 10 which is free of an ETBN X40 additive for similar total rubber contents. Moreover, comparing recipes 11 and 13 of Table IV to recipes 3 and 4 of Table II, respectively, show that a 50/50 blend of Derakane 8084 and Derakane 411 containing an RLP additive show about a 1.3 and about a 1.5 fold increase in fracture energy, for similar levels of total rubber content over the Derakane 411 having ETBN X40 admixed therewith. This conclusion is shown graphically in FIG. 1. Moreover, retention of mechanical properties in the Derakane 411/8084 blends containing RLP additives is good.

EXAMPLE 10

The recipes set forth below in Table V were prepared and tested in the same manner as the recipes in Table II of Example 7 above. An epoxy-terminated butadiene-acrylonitrile type copolymer additive containing 26 percent acrylonitrile, was admixed with Derakane 8084 in recipes 14 and 15 and with Derakane 411 in recipes 16 through 18.

TABLE V

| | RECIPES | | | | |
|---|---|---|---|---|---|
| | 14 | 15 | 16 | 17 | 18 |
| DERAKANE 8084 | 100 | 100 | 0 | 0 | 0 |
| DERAKANE 411 | 0 | 0 | 100 | 100 | 100 |
| ETBNX13 (26% bound acrylonitrile) | 2.5 | 7.5 | 7.5 | 10 | 15 |
| Cobalt Nap. (10%) | 0.5 | 0.5 | 0.5 | 0.5 | 0.5 |
| MEK Peroxide | 2 | 2 | 2 | 2 | 2 |
| Tot. Rubber Cont. | 9.6 | 13.7 | 6.2 | 8.2 | 12.3 |
| PROPERTIES AFTER CURING 1 HR. @ 60° C. + 2 HRS. @ 120° C. | | | | | |
| Ten. Stg., psi | 8160 | 6680 | 8230 | 7150 | 6000 |
| Elongation, % | 8.79 | 5.95 | 3.51 | 3.68 | 3.53 |
| Modulus, GPa | 2.24 | 1.91 | 2.47 | 2.04 | 1.92 |
| $K_{Ic}$, MN/m$^{3/2}$ | 1.77 | 2.26 | 1.31 | 1.54 | 1.41 |
| $G_{Ic}$, kJ/m$^2$ | 1.24 | 2.36 | 0.61 | 1.03 | 0.91 |
| Tg, °C. | 113 | 112 | 117 | 117 | 119 |

Figure 2:
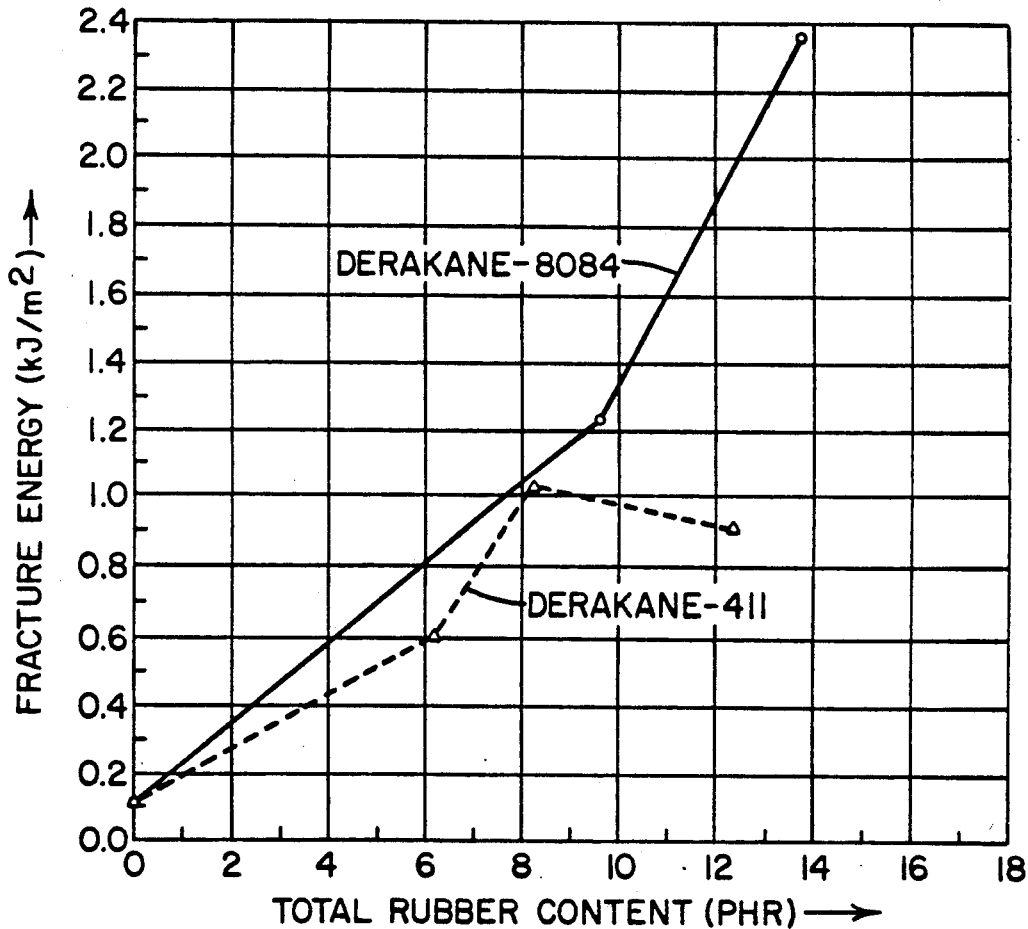
FIG. 2 is a graph showing the fracture energy of two different vinyl ester resins, plotted against the total rubber content of the resins, including the amount of epoxy-terminated butadiene-acrylonitrile type copolymer additive containing 26 percent bound acrylonitrile admixed with the resins.

The mechanical property and fracture energy results for the ETBN additive utilized in the recipes of Table V above are similar to those observed for ETBN having 17 percent bound acrylonitrile content as set forth in Tables II and III above, thus showing that ETBN containing 26 percent bound acrylonitrile gives good results as an RLP additive similar to those attained when ETBN containing 17 percent bound acrylonitrile is utilized. FIG. 2 is a plot of the fracture energy data from Table V against the total rubber content of the modified resin system.

EXAMPLE 11

The recipes set forth below in Table VI were prepared and tested in the same manner as the recipes in Table II of Example 7. Table VI provides data for recipes of vinyl ester resins admixed with vinylidene-terminated butadiene-acrylonitrile type copolymer additive containing 20 percent bound acrylonitrile, and sold under the label VTBNX X43 by the B. F. Goodrich Company.

TABLE VI

| | RECIPE | | | |
|---|---|---|---|---|
| | 19 | 20 | 21 | 22 |
| DERAKANE 8084 | 100 | 100 | 0 | 0 |
| DERAKANE 411 | 0 | 0 | 100 | 100 |
| VTBNX X43 (20% bound acrylonitrile) | 5 | 10 | 5 | 10 |
| Styrene | 5 | 10 | 5 | 10 |
| Cobalt Nap. | 0.5 | 0.5 | 0.5 | 0.5 |
| MEK Peroxide | 2 | 2 | 2 | 2 |
| Tot. Rubber Cont. | 12.1 | 16.6 | 4.6 | 9.1 |
| PROPERTIES AFTER CURING 1 HR. @ 60° C. + 2 HRS. @ 120° C. | | | | |
| Ten. Stg., psi | 6550 | 4310 | 7310 | 5970 |
| Elongation, % | 3.69 | 6.5 | 2.33 | 2.37 |
| Modulus, GPa | 1.85 | 1.22 | 2.23 | 2.04 |
| $K_{Ic}$, MN/m$^{3/2}$ | 1.5 | 1.4 | 0.94 | 1 |
| $G_{Ic}$, kJ/m$^2$ | 1.08 | 1.41 | 0.35 | 0.43 |
| Tg, °C. | 93.6 | 96.2 | 120 | 113 |

Figure 3:
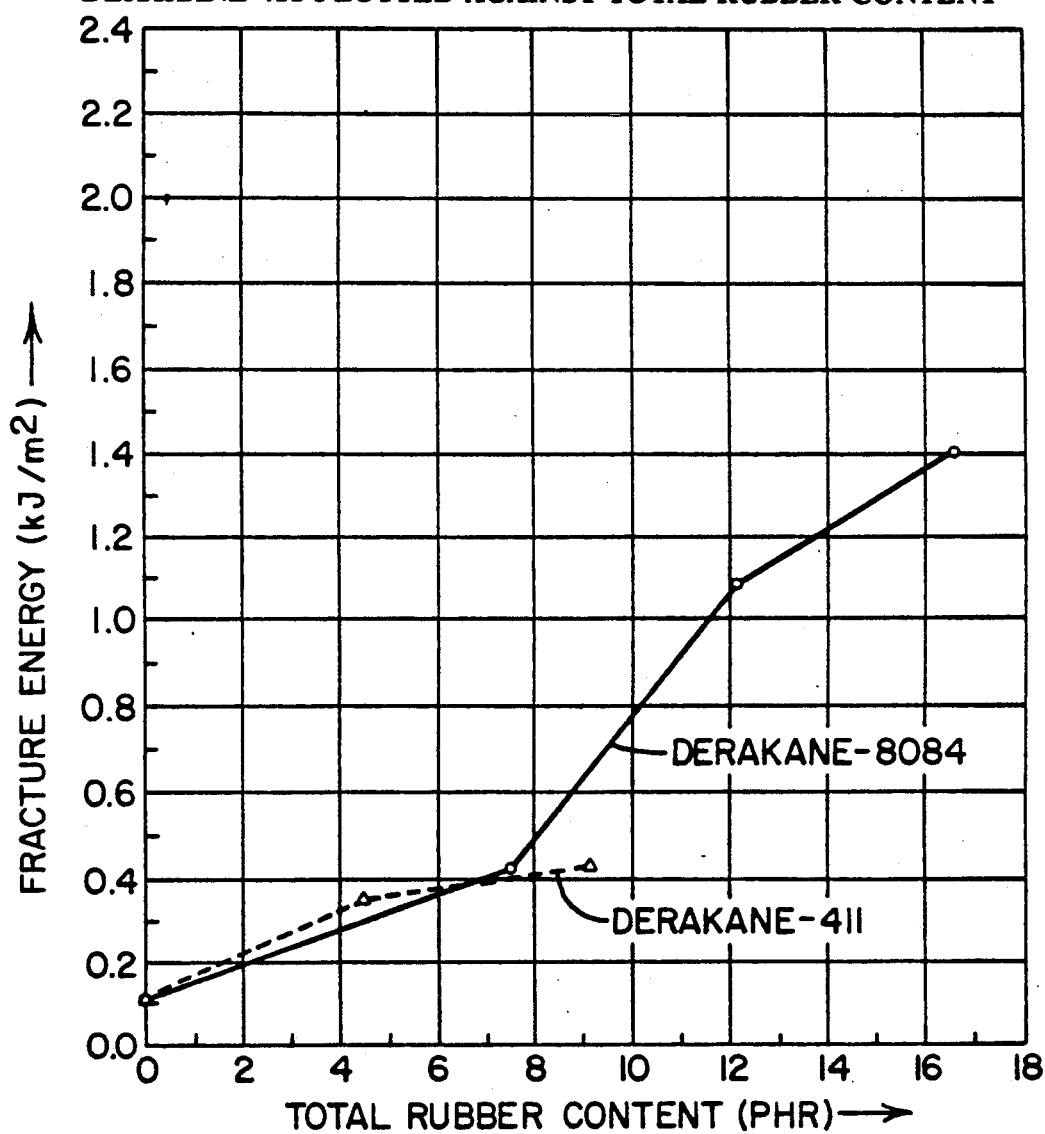
FIG. 3 is a graph showing the fracture energy of two different vinyl ester resins, plotted against the total rubber content of the resins, including the amount of vinylidine-terminated butadiene-acrylonitrile type copolymer additive containing 20 percent bound acrylonitrile admixed with the resins.

The data of Table VI shows that admixture of VTBNX X43 RLP additive with Derakane 8084 gives tougher cured systems than observed in Derakane 8084 alone (see recipes 5 and 10 of Tables III and IV, respectively), or than observed in an admixture of VTBNX X43 with Derakane 411. However, the absolute values of fracture energies are lower for VTBNX X43 (see receipes 19 and 20) compared with ETBN X40 (containing 17 percent bound acrylonitrile) as shown in recipes 7 and 9 of Table III above for similar total rubber content levels. The absolute values of fracture energies are lower for VTBNX X43 of recipe 19 compared with ETBN XI3 containing 26 percent bound acrylonitrile as shown in recipe 15 of Table V above for similar total rubber content levels. FIG. 3 is a plot of fracture energies versus the amount of total rubber content for the data of Table VI, and when compared with FIGS. 1 and 2 shows that the fracture energies for VTBNX X43 additive modified Derakane 8084 are lower than the fracture energies for ETBN X40 and ETBN X13 additive modified Derakane 8084, respectively.

EXAMPLE 12

The recipes set forth below in Table VII were prepared and tested in the same manner as the recipes of Table II of Example 7. A hydroxyl-terminated ephihalohydrin type polymer additive, sold under the label Hydrin 10X2 by the B. F. Goodrich Company of Akron, Ohio, was admixed with Derakane 8084 and Derakane 411.

TABLE VII

| | RECIPE | | | | |
|---|---|---|---|---|---|
| | 23 | 24 | 25 | 26 | 27 |
| DERAKANE 8084 | 100 | 100 | 0 | 0 | 0 |
| DERAKANE 411 | 0 | 0 | 100 | 100 | 100 |
| HYDRIN 10X2 (no. avg. molec. wt. = 3300) | 2.5 | 7.5 | 5 | 10 | 15 |
| Styrene | 2.5 | 7.5 | 5 | 10 | 15 |
| Cobalt Nap. | 0.5 | 0.5 | 0.5 | 0.5 | 0.5 |
| MEK Peroxide | 2 | 2 | 2 | 2 | 2 |
| Tot. Rubber Cont. | 10 | 15 | 5 | 10 | 15 |
| PROPERTIES AFTER CURING 1 HR. @ 60° C. + 2 HRS. @ 120° C. | | | | | |
| Ten. Stg., psi | 7980 | 7610 | 8880 | 6620 | 7130 |
| Elongation, % | 2.66 | 4.41 | 3.14 | 2.37 | 3.14 |
| Modulus, GPa | 2.14 | 1.93 | 2.02 | 1.00 | 1.88 |
| $K_{Ic}$, MN/m$^{3/2}$ | 1.33 | 1.97 | 0.923 | 0.894 | 0.861 |
| $G_{Ic}$, kJ/M$^2$ | 0.73 | 1.77 | 0.37 | 0.35 | 0.35 |
| Tg, °C. | 114 | 114 | 121 | 120 | 120 |

Figure 4:
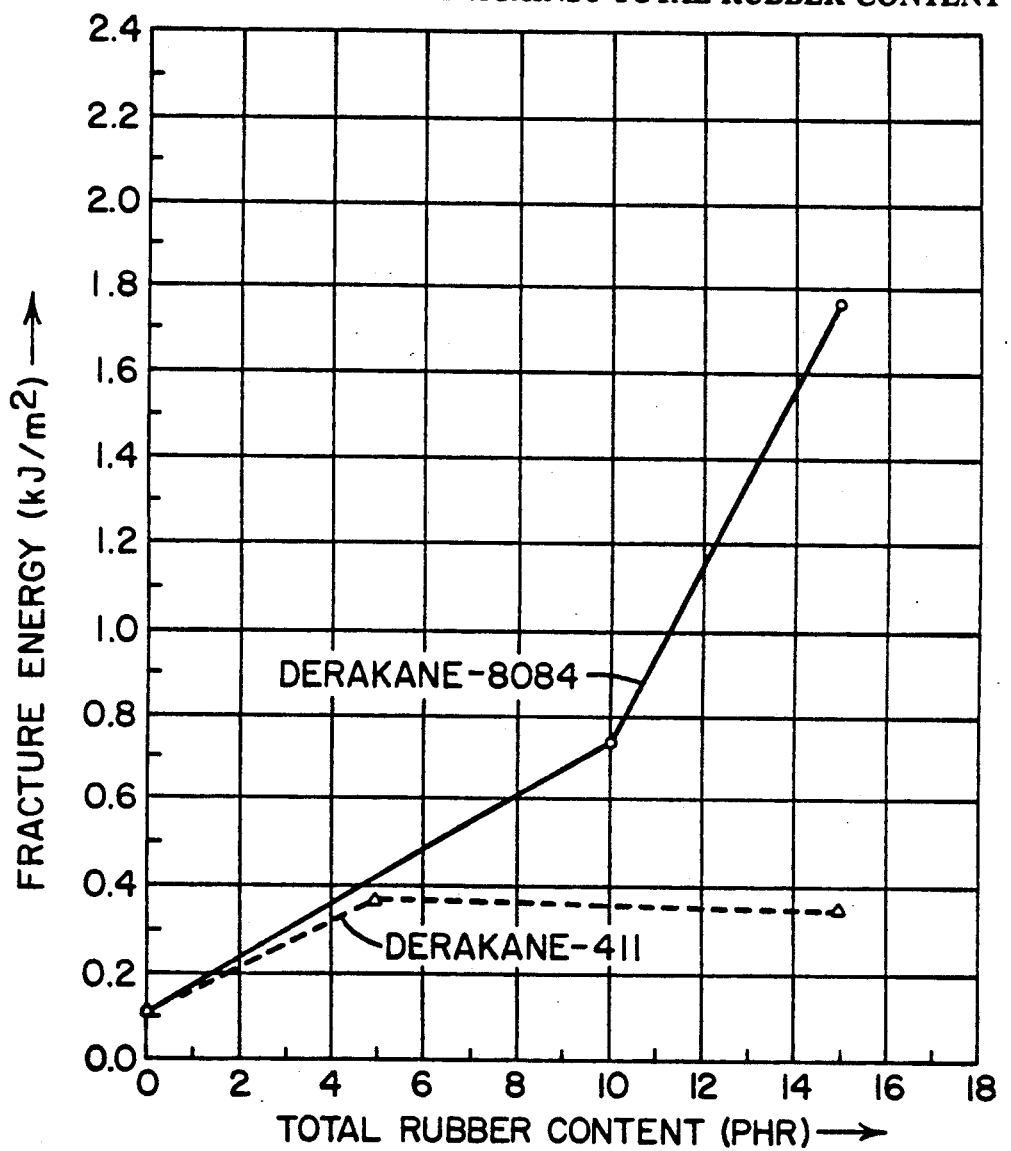
FIG. 4 is a graph showing the fracture energy of two different vinyl ester resins, plotted against the total rubber content of the resins, including the amount of hydroxyl-terminated epihalohydrin type polymer additive admixed with the resins.

The fracture energy data from Table VII is plotted in FIG. 4. From the data set forth above in Table VII and the graph in FIG. 4, it is observed that Hydrin 10X2 additive RLP does not give comparably good fracture energy values for similar total rubber contents when admixed with Derakane 8084 as illustrated in recipes 23 and 24, as does ETBN X40 additive as shown in recipes 6 and 9 of Table III and FIG. 1, nor does Hydrin 10X2 compare favorably with the fracture energies observed in Derakane 8084 having an ETBN RLP additive containing 26 percent bound acrylonitrile as shown in recipes 14 and 15 of Table V and FIG. 2.

Thus, it can be seen from the data set forth above in the examples and tables that vinyl ester resins modified according to the present invention display improved toughness, as measured by fracture energy, over vinyl ester resins modified with RLPs by either of the prior art methods of adduction or admixing alone. Vinyl ester resins modified in accordance with the present invention have use in numerous corrosion resistant applications such as pipes and adhesives.

While in accordance with the Patent Statutes, the best mode and preferred embodiment has been set forth, the scope of the invention is not limited thereto, but rather by the scope of the attached claims.

What is claimed is:

1. A toughened cured vinyl ester resin composition comprising:
    a cured admixture of a prereacted vinyl ester base resin having a reactive liquid polymer reacted into its backbone; and
    an effective amount of a reactive liquid polymer additive to improve the fracture energy of the cured vinyl ester resin composition by an amount greater than about 1.2 times the base resin.

2. The composition of claim 1, wherein said base resin is the reaction product of an epoxy resin, an unsaturated monocarboxylic acid and the reactive liquid polymer reacted into the backbone of said base resin; wherein said backbone reactive liquid polymer is a polyfunctional carboxyl-terminated type polymer having a functionality of from about 0.8 to about 3.5; wherein said additive reactive liquid polymer is utilized in an amount of from about 2 parts to about 30 parts per 100 parts of said base resin; and wherein said cured vinyl ester resin composition has a fracture energy of greater than about 1.5 times said base resin.

3. The composition of claim 2, wherein said additive reactive liquid polymers are nonfunctional, monofunctional, difunctional, or blends thereof.

4. The composition of claim 2, wherein said backbone reactive liquid polymer is a statistical difunctional carboxyl-terminated type polymer having a functionality of from about 1.7 to about 2.4; wherein said additive reactive liquid polymer is utilized in an amount of from about 2 to about 20 parts per 100 parts of said base resin; and wherein said cured vinyl ester resin composition has a fracture energy of greater than about 2 times said base resin.

5. The composition of claim 4, wherein said backbone reactive liquid polymer is a carboxyl-terminated butadiene type polymer having a functionality of about 2; wherein said additive reactive liquid polymer is a polyfunctional carboxyl-terminated butadiene type polymer, a polyfunctional carboxyl-terminated butadiene-acrylonitrile type random copolymer, a statistical difunctional carboxyl-terminated butadiene-acrylonitrile-acrylic acid terpolymer, a polyfunctional epoxy-terminated butadiene-acrylonitrile type copolymer, a statistical difunctional hydroxyl-terminated epihalohydrin type polymer, or a statistical difunctional vinylidene-terminated butadiene-acrylonitrile type copolymer; wherein said additive reactive liquid polymer is utilized in an amount of from about 2 parts to about 10 parts per 100 parts of said base resin; and wherein said cured vinyl ester resin composition has a fracture energy of greater than about 3 times said base resin and a particle size of less than about 10,000 angstroms.

6. The composition of claim 4, wherein said backbone reactive liquid polymer is a carboxyl-terminated butadiene-acrylonitrile type random copolymer having a functionality of from about 1.8 to about 1.85; wherein said additive reactive liquid polymer is utilized in an amount of from about 2 parts to about 10 parts per 100 parts of said base resin; wherein said additive reactive liquid polymer is a polyfunctional carboxyl-terminated butadiene type polymer, a polyfunctional carboxyl-terminated butadiene-acrylonitrile type random copolymer, a statistical difunctional carboxyl-terminated butadiene-acrylonitrile-acrylic acid terpolymer, a polyfunctional epoxy-terminated butadiene-acrylonitrile type copolymer, a statistical difunctional hydroxyl-terminated epihalohydrin type polymer, or a statistical difunctional vinylidene-terminated butadiene-acrylonitrile type copolymer; wherein said additive reactive liquid polymer is utilized in an amount of from about 2 parts to about 10 parts per 100 parts of said base resin; and wherein said cured vinyl ester resin composition has a fracture energy of greater than about 3 times said base resin and a particle size of less than about 10,000 angstroms.

7. The composition of claim 4, wherein said backbone reactive liquid polymer is a carboxyl-terminated butadiene-acrylonitrile-acrylic acid type terpolymer having a functionality of about 2.3; wherein said additive reactive liquid polymer is a polyfunctional carboxyl-terminated butadiene type polymer, a polyfunctional carboxyl-terminated butadiene-acrylonitrile type random copolymer, a statistical difunctional carboxyl-terminated butadiene-acrylonitrile-acrylic acid terpolymer, a polyfunctional epoxy-terminated butadiene-acrylonitrile type copolymer, a statistical difunctional hydroxyl-terminated epihalohydrin type polymer, or a statistical difunctional vinylidene-terminated butadiene-acrylonitrile type copolymer; wherein said additive reactive liquid polymer is utilized in an amount of from about 2 parts to about 10 parts per 100 parts of said base resin; and wherein said cured vinyl ester resin composition has a fracture energy of greater than about 3 times said base resin and a particle size of less than about 10,000 angstroms.

8. The composition of claim 5, wherein said additive reactive liquid polymer is a statistical difunctional epoxy-terminated butadiene-acrylonitrile type copolymer containing 17 percent or 26 percent bound acrylonitrile; wherein said cured vinyl ester resin composition has a fracture energy of greater than about 4 times said base resin and a particle size of less than about 1,000 angstroms.

9. The composition of claim 6, wherein said additive reactive liquid polymer is a statistical difunctional epoxy-terminated butadiene-acrylonitrile type copolymer containing 17 percent or 26 percent bound acrylonitrile; wherein said cured vinyl ester resin composition has a fracture energy of greater than about 4 times said base resin and a particle size of less than about 1,000 angstroms.

10. The composition of claim 7, wherein said additive reactive liquid polymer is a statistical difunctional epoxy-terminated butadiene-acrylonitrile type copolymer containing 17 percent or 26 percent bound acrylonitrile; wherein said cured vinyl ester resin composition has a fracture energy of greater than about 4 times said base resin and a particle size of less than about 1,000 angstroms.

11. The composition of claim 8, wherein said cured vinyl ester resin composition has a fracture energy of from greater than about 5 times to about 50 times said base resin.

12. The composition of claim 9, wherein said cured vinyl ester resin composition has a fracture energy of from greater than about 5 times to about 50 times said base resin.

13. The composition of claim 10, wherein said cured vinyl ester resin composition has a fracture energy of from greater than about 5 times to about 50 times said base resin.

14. A vinyl ester resin composition comprising:

a generally uniformly dispersed admixture of a prereacted vinyl ester base resin having a reactive liquid polymer reacted into its backbone; and an effective amount of a reactive liquid polymer additive to improve the fracture energy of the vinyl ester resin composition.

15. The composition of claim 14, wherein said base resin is the reaction product of an epoxy resin, an unsaturated monocarboxylic acid and the reactive liquid polymer reacted into the backbone of said base resin; wherein said backbone reactive liquid polymer is a polyfunctional carboxyl-terminated type polymer having a functionality of from about 0.8 to about 3.5; wherein said additive reactive liquid polymer is utilized in an amount of from about 2 parts to about 30 parts per 100 parts of said base resin; and wherein said cured vinyl ester resin composition has a fracture energy of greater than about 1.5 times said base resin.

16. The composition of claim 15, wherein said backbone reactive liquid polymer is a statistical difunctional carboxyl-terminated type polymer having a functionality of from about 1.7 to about 2.4; wherein said additive reactive liquid polymer is utilized in an amount of from about 2 to about 20 parts per 100 parts of said base resin; and wherein said cured vinyl ester resin composition has a fracture energy of greater than about 2 times said base resin.

17. The composition of claim 16, wherein said backbone reactive liquid polymer is a carboxyl-terminated butadiene type polymer having a functionality of about 2; wherein said additive reactive liquid polymer is a polyfunctional carboxyl-terminated butadiene type polymer, a polyfunctional carboxyl-terminated butadiene-acrylonitrile type random copolymer, a statistical difunctional carboxyl-terminated butadiene-acrylonitrile-acrylic acid terpolymer, a polyfunctional epoxy-terminated butadiene-acrylonitrile type copolymer, a statistical difunctional hydroxyl-terminated epihalohydrin type polymer, or a statistical difunctional vinylidene-terminated butadiene-acrylonitrile type copolymer; wherein said additive reactive liquid polymer is utilized in an amount of about 2 parts to about 10 parts per 100 parts of said base resin; and wherein said cured vinyl ester resin composition has a fracture energy of greater than about 3 times said base resin and a particle size of less than about 10,000 angstroms.

18. The composition of claim 16, wherein said backbone reactive liquid polymer is a carboxyl-terminated butadiene-acrylonitrile type random copolymer having a functionality of from about 1.8 to about 1.85; wherein said additive reactive liquid polymer is utilized in an amount of from about 2 parts to about 10 parts per 100 parts of said base resin; wherein said additive reactive liquid polymer is a polyfunctional carboxyl-terminated butadiene type polymer, a polyfunctional carboxyl-terminated butadiene-acrylonitrile type random copolymer, a statistical difunctional carboxyl-terminated butadiene-acrylonitrile-acrylic acid terpolymer, a polyfunctional epoxy-terminated butadiene-acrylonitrile type copolymer, a statistical difunctional hydroxyl-terminated epihalohydrin type polymer, or a statistical difunctional vinylidene-terminated butadiene-acrylonitrile type copolymer; wherein said additive reactive liquid polymer is utilized in an amount of from about 2 parts to about 10 parts per 100 parts of said base resin; and wherein said cured vinyl ester resin composition has a fracture energy of greater than about 3 times said base resin and a particle size of less than about 10,000 angstroms.

19. The composition of claim 16, wherein said backbone reactive liquid polymer is a carboxyl-terminated butadiene-acrylonitrile-acrylic acid type terpolymer having a functionality of about 2.3; wherein said additive reactive liquid polymer is a polyfunctional carboxyl-terminated butadiene type polymer, a polyfunctional carboxyl-terminated butadiene-acrylonitrile type random copolymer, a statistical difunctional carboxyl-terminated butadiene-acrylonitrile-acrylic acid terpolymer, a polyfunctional epoxy-terminated butadiene-acrylonitrile type copolymer, a statistical difunctional hydroxyl-terminated epihalohydrin type polymer, or a statistical difunctional vinylidene-terminated butadiene-acrylonitrile type copolymer; wherein said additive reactive liquid polymer is utilized in an amount of from about 2 parts to about 10 parts per 100 parts of said base resin; and wherein said cured vinyl ester resin composition has a fracture energy of greater than about 3 times said base resin and a particle size of less than about 10,000 angstroms.

20. The composition of claim 17, wherein said additive reactive liquid polymer is a statistical difunctional epoxy-terminated butadiene-acrylonitrile type copolymer containing 17 percent or 26 percent bound acrylonitrile; wherein said cured vinyl ester resin composition has a fracture energy of greater than about 4 times said base resin and a particle size of less than about 1,000 angstroms.

21. The composition of claim 18, wherein said additive reactive liquid polymer is a statistical difunctional epoxy-terminated butadiene-acrylonitrile type copolymer containing 17 percent or 26 percent bound acrylonitrile; wherein said cured vinyl ester resin composition has a fracture energy of greater than about 4 times said base resin and a particle size of less than about 1,000 angstroms.

22. The composition of claim 19, wherein said additive reactive liquid polymer is a statistical difunctional epoxy-terminated butadiene-acrylonitrile type copolymer containing 17 percent or 26 percent bound acrylonitrile; wherein said cured vinyl ester resin composition has a fracture energy of greater than about 4 times said base resin and a particle size of less than about 1,000 angstroms.

23. The composition of claim 20, wherein said cured vinyl ester resin composition has a fracture energy of from greater than about 5 times to about 50 times said base resin.

24. The composition of claim 21, wherein said cured vinyl ester resin composition has a fracture energy of from greater than about 5 times to about 50 times said base resin.

25. The composition of claim 22, wherein said cured vinyl ester resin composition has a fracture energy of from greater than about 5 times to about 50 times said base resin.

* * * * *